US007937402B2

(12) United States Patent
Feng et al.

(10) Patent No.: US 7,937,402 B2
(45) Date of Patent: May 3, 2011

(54) NATURAL LANGUAGE BASED LOCATION QUERY SYSTEM, KEYWORD BASED LOCATION QUERY SYSTEM AND A NATURAL LANGUAGE AND KEYWORD BASED LOCATION QUERY SYSTEM

(75) Inventors: Qiangze Feng, Beijing (CN); Hongwei Qi, Beijing (CN); Yuguang Liu, Beijing (CN); Huifeng Liu, Beijing (CN); Yabo Wang, Beijing (CN); Xiaowei Liu, Beijing (CN); Toshikazu Fukushima, Beijing (CN)

(73) Assignee: NEC (China) Co., Ltd., Beijing (CN)

( * ) Notice: Subject to any disclaimer, the term of this patent is extended or adjusted under 35 U.S.C. 154(b) by 332 days.

(21) Appl. No.: 11/775,052

(22) Filed: Jul. 9, 2007

(65) Prior Publication Data

US 2008/0010259 A1 Jan. 10, 2008

(30) Foreign Application Priority Data

Jul. 10, 2006 (CN) .......................... 2006 1 0106226

(51) Int. Cl.
*G06F 7/00* (2006.01)
*G06F 17/30* (2006.01)

(52) U.S. Cl. .......................... 707/759; 707/765; 707/780

(58) Field of Classification Search ........................ None
See application file for complete search history.

(56) References Cited

U.S. PATENT DOCUMENTS 7,337,170 B2 * 2/2008 Lee et al. .......................... 707/6

(Continued)

FOREIGN PATENT DOCUMENTS

CN 1466367 A 1/2004

(Continued)

OTHER PUBLICATIONS

"Cognition of Geographic Information", by Montello et al., 2005, In R.B. McMaster & E.L. Usery (Eds.), A research agenda for geographic information science (pp. 61-91), Boca Raton, FL: CRC Press.*

(Continued)

*Primary Examiner* — Jay A Morrison
(74) *Attorney, Agent, or Firm* — Sughrue Mion, PLLC

(57) ABSTRACT

A natural language based location query system and a method thereof. The system comprises a receiving device which receives a request for natural language query from a user terminal; an access device which accesses a location ontology base and a location query language base that are external to the system or internal in the system, wherein the location ontology base comprising knowledge descriptions about the field of a location service, and the location query language base comprising a language model for the location service query; a natural language query processing device which performs at least one of a fuzzy processing and an indirection processing on the received request for natural language query by searching the location ontology base and the location query language base with the access device, retrieves location information corresponding to the request from a location database; and a sending device which sends the location information to the user terminal. This invention also provides a keyword based location query system and a method thereof, and a natural language based and keyword based location query system and a method thereof. This invention not only process user fuzzy query and indirect query, but also process compound sentence query and query having semantic error. Therefore, the degree of freedom of user query is enhanced and the location query is more flexible and accurate.

23 Claims, 24 Drawing Sheets

U.S. PATENT DOCUMENTS

2002/0161587 A1 10/2002 Pitts, III et al.

FOREIGN PATENT DOCUMENTS

JP 2003-345821 A 12/2003
JP 2005-165958 A 6/2005

OTHER PUBLICATIONS

Eetu Makela. Survey of semantic search research. In Proceedings of the Seminar on Knowledge Management on the Semantic Web. Department of Computer Science, University of Helsinki, 2005.*

Frank, A. (2003). Ontology for spatio-temporal Databases. In M. Koubarakis et al. (Eds.), Spatiotemporal Databases: The Chorochronos Approach (vol. 2520, pp. 9-77). Berlin: Springer.*

Precisiated natural language (PNL), AI Magazine, vol. 25 , Issue 3 (Fall 2004), pp. 74-91, Year of Publication: 2004, ISSN:0738-4602, Author: Lotfi A. Zadeh.*

Qualitative Geospatial Processing, Ontology and Spatial Metaphor, by David Dodds, GML and Geo-Spatial Web Services, Conference Jul. 18-22, 2005, Vancouver, British Columbia.*

Visualization of Qualitative Locations in Geographic Information Systems, by Yao, Cartography and Geographic Information Science, vol. 32, No. 4, 2005, pp. 219-229.*

"Geographic Location Tags on Digital Images", by Toyama et al., MM'03, Nov. 2-8, 2003, Berkeley, California, USA.*

Masao Kawamura, ATOK15 for Mac OS X, Mac Power, Japan, ASCII Corporation, vol. 13, p. 126, Aug. 1, 2002.

* cited by examiner

Category Table

| Name | Type | Parent | Synonymous words (Chinese) | Synonymous words (English) |
|---|---|---|---|---|
| 大厦(plaza) | basic | Location | 大楼 | building\|mansion |
| 学校(school) | basic | Location | 上学 | |
| 饭店(restaurant) | basic | Location | 餐厅\|餐馆\|酒楼\|吃饭\|好吃 | restaurant \| eat |
| 银行(bank) | extended | Finance | 储蓄所\|存钱\|取钱 | bank \| save money |
| 大学(university) | extended | School | | university \| college |
| 快餐店(fast food restanrant) | extended | Restaurant | 快餐\|速食 | snack\|fast food |
| 肯德基(KFC) | chain store | Fast food restaurant | | KFC |
| ... | ... | ... | ... | ... |

Entity Table

| Name | Parent |
|---|---|
| Tsinghua University | University |
| Innovation Plaza | Plaza |
| KFC Zhongguancun Store | KFC |
| ... | ... |

Fig. 5b

| Categories (Chinese) | Type | Example entities (Chinese) |
|---|---|---|
| Road (路) | Basic | Second Ring (二环路) |
| Region (区域) | Basic | Zhongguancun(中关村) |
| Bridge (桥) | Basic | Xizhimen Bridge (西直门桥) |
| Plaza (大厦) | Basic | Innovation edifice (创新大厦) |
| School(学校) | Basic | Zhongguancun High School(中关村中学) |
| Restaurant(饭店) | Basic | Beijing Hotel(北京饭店) |
| Speedway (高速) | Extended | Jing-Shi Speedway (京石高速) |
| University(大学) | Extended | Tsinghua University(清华大学) |
| Bank(银行) | Extended | China Bank(中国银行) |
| KFC(肯德基) | Chain Store | KFC Zhongguancun Store(肯德基中关村店) |
| Macdonald's(麦当劳) | Chain Store | Macdonald's Zhongguancun Store(麦当劳中关村店) |
| Carrefour(家乐福) | Chain Store | Carrefour Zhongguancun Store(家乐福中关村店) |
| ... | | ... |

Fig. 5c

| Attribute (Chinese) | Type | Example value (Chinese) |
|---|---|---|
| StartPoint (起点) | Attribute of Road | Xuezhi Bridge (学知桥) |
| EndPoint (终点) | Attribute of Road | East of Chengfu Road (成府路东口) |
| Address (地址) | Attribute | 11F, Building A, Innovation Plaza, Tsinghua Science Park.No1, Zhongguangcun East Road, Haidian District, Beijing (北京市海淀区中关村东路清华科技园1号创新大厦A座11层 ) |
| PhoneNumber (电话) | Attribute | 010-62705962 |
| ZipCode (邮政编码) | Attribute | 100080 |
| BusinessService (业务) | Attribute | Chinese food (中餐); Computer (计算机); |
| Contact person (联系人) | Attribute | Miss Wang (王小姐) |
| geo-part-of(x, y) | Relation | geo-part-of(创新大厦, 清华科技园) |
| isa(x, y) | Relation | isa(中国银行, 银行) |
| north-of(x, y) | Relation | north-of(西直门桥, 复兴门桥) |
| between(x, y, z) | Relation | between(西二环中路,西二环北路,西二环南路) |
| ... | | ... |

Fig. 5d

| Axiom | Example |
|---|---|
| isa(x, y) & isa(y, z) → isa(x, z) | isa(KFC, fast food restaurant) & isa(fast food restaurant, restaurant) → isa(KFC, restaurant) |
| geo-part-of(x, y) & geo-part-of(y, z) → geo-part-of(x, z) | geo-part-of(NEC labs China, Innovation Plaza) & geo-part-of(Innovation Plaza, Tsinghua Science Park)→ geo-part-of(NEC labs China, Tsinghua Science Park) |
| north-of(x, y) → south-of(y, x) | north-of(Xizhimen Bridge, Gate Bridge) → south-of(Gate Bridge, Xizhimen Bridge) |
| geo-part-of(x, y) & south-of(y, z) → south-of(x, z) | geo-part-of(NEC labs China, Innovation Plaza) & south-of(Innovation Plaza, Tsinghua University) → south-of(NEC labs China, Tsinghua University) |
| ... | ... |

Fig. 5e

```
Defquery Common Query Language
{
   // syntax part
syntax: <CommonQuery1>={<?C1(geo-entity)>}<#名词>
syntax: <CommonQuery2>={<?C1(geo-entity)>}<#副词>{<?C2(geo-category|geo-entity)>}[<!位于动词|!拥有动词>][<!地点疑问词|!什么疑问词>]
...
}
```

```
Defquery Map Query Language
{
   // syntax part
syntax: <LocationQuery>={<?C(geo-entity)>}<!位于动词><!地点疑问词> | <CommonQuery1(<#名词>=<!位置名词>)>
syntax: <NearNeighborQuery>=<CommonQuery2(<#副词>=[<!附近副词>])>
syntax: <NearestNeighborQuery>=<CommonQuery2(<#副词>=<!最近副词>)>

   // action part
action: isSyntax(<LocationQuery>)→QueryLocation(?C)
action: isSyntax(<NearNeighborQuery>)→QueryNear(?C1, ?C2)
action: isSyntax(<NearestNeighborQuery>)→QueryNearest(?C1, ?C2)
}
```

```
Defquery Driving Route Query Language
{
   // syntax part
syntax: <PathPlanningQuery>=<?C1(geo-entity)>[<!怎么疑问词>]<!到达介词><?C2(geo-entity)>

   // action part
action: isSyntax(<PathPlanningQuery>)→QueryPath(?C1, ?C2)
}
```

constant table

<table>
<tr><th>ID</th><th>type</th><th>POS</th><th>word list</th></tr>
<tr><td>1</td><td>位于动词</td><td>verb</td><td>在|位于|地处</td></tr>
<tr><td>2</td><td>位置名词</td><td>verb</td><td>位置|方位|地址</td></tr>
<tr><td>3</td><td>附近副词</td><td>adverb</td><td>附近|邻近|周围|旁边|周边</td></tr>
<tr><td>4</td><td>最近副词</td><td>adverb</td><td>最近|距离最短</td></tr>
<tr><td>5</td><td>什么疑问词</td><td>interrogative</td><td>什么|哪些|哪几个|哪个|啥</td></tr>
<tr><td>6</td><td>地点疑问词</td><td>interrogative</td><td>什么地方|啥地方|何处|何地|哪|哪里|哪块|哪儿</td></tr>
<tr><td>7</td><td>拥有动词</td><td>verb</td><td>有|拥有|包括</td></tr>
<tr><td>...</td><td>...</td><td></td><td>...</td></tr>
</table>

Fig. 6

```
DefAnswerTemplate QueryNearest(X,Y)
{
    Entity=<GisNearest(X, Y)>
    Address=<GetValue(Entity,address)>
    EnglishAnswer=<Entity> is the nearest <Y> to the <X>, and the address is <Address>
    ChineseAnswer=<X>最近的<Y>是<Entity>，地址是<Address>
    JapaneseAnswer=...
}
```

Fig. 8

| ID | Name | Latitude | Longitude | Address |
|---|---|---|---|---|
| 346 | 创新大厦(Innovation Plaza) | 116.3326 | 39.9917 | ... |
| 1097 | 招商银行(China Merchants Bank) | 116.3340 | 39.9919 | ... |
| 1587 | 中国银行(China Bank) | 116.3326 | 39.9918 | 海淀区中关村东路，清华科技园1号 Tsinghua Science Park.No1, Zhongguangcun East Road, Haidian District, Beijing |

Location DB

| ID | Name | Latitude | Longitude | Address |
|---|---|---|---|---|
| 43569 | 海龙电子大厦 (Hailong Electronic Plaza) | 116.3326 | 39.9917 | 北京市海淀区中关村大街1号 (Zhongguancun Stree No.1) |
| 596 | 中关村大街 (Zhongguancun Street) | ... | ... | ... |
| 1017 | 海淀中路 (Haidian Middle Street) | ... | ... | ... |

NATURAL LANGUAGE BASED LOCATION QUERY SYSTEM, KEYWORD BASED LOCATION QUERY SYSTEM AND A NATURAL LANGUAGE AND KEYWORD BASED LOCATION QUERY SYSTEM

BACKGROUND OF THE INVENTION

1. Field of the Invention

The present invention relates to a location search engine field, and specifically, to a natural language based location query system and a method therefore, a keyword based location query system and a natural language based and keyword based location query system and the method thereof.

2. Description of the Prior Art

With the development of mobile communication networks, especially the beginning eve of 3G in China, local search, closely linked to people's daily life, will have a big market in the near future.

With the rapid development of technology and economy, people's life or work becomes more and more global. When enter a strange environment, you maybe need information about a hotel, car rental or medical help. More specifically, you even need to find something in your new residence, such as a plumber, a restaurant, an accountant or a florist.

Therefore, location search plays an important role. However, a user generally has to select the result he or she needs from a plurality of results after the user submits a query request in the current search engine.

Particularly, a large amount of time is required to scroll through mobile search results when a user performs a location information search using a mobile phone because of the small screen and the limitation phone keypads. So the traditional search engine can not provide a search result of high accuracy and efficiency. First, a user prefers to query information more freely, and secondly, mobile users prefer to access information precisely and concisely.

Some of the existing search engines provide local information services to mobile users. For example, Google's local search allows a user to search stores and business information in a specific area. Yahoo! local search can be used for finding restaurants, entertainment venues, and businesses. Those two search engines employ the same search mechanism with respect to mobile users and network users. Therefore, the local search results for mobile users are exactly the same as the search result with respect to local search on a computer.

Mobile Info Search can retrieve all kinds of information related to location automatically from the contents of page, such as company's name and address. The information is associated with a map and is provided to a user to search for location information based on keyword search.

The Answers Anywhere Mobile is a middleware platform, which provides a user with a wireless apparatus direct access to data service through interacting modes such as SMS, MMS and voice. Moreover, it provides advanced natural language and context understanding technology. Moreover, some of the existing patents focus on the method of providing natural language processing in information service systems.

In the U.S. Pat. No. 2002161587A1, a method of providing natural language processing in a location-based service system is provided. The system can receives a voice request and generate a response based on the geographic location of said remote terminal.

The Chinese patent CN 1466367A presents a mobile human-knowledge interactive system and method. A user can query multi-domain knowledge (e.g. weather information, traffic information) through mobile phone. It has two advantages: (1) The system allows a user to query through natural language; (2) The system can identify and correct misspellings in user queries.

Although mobile users prefer to query location information freely and accurately, the search preferences are varied from users. Firstly, a user may search local information indirectly (e.g., using the word "something to eat" to replace the word "restaurant"). Secondly, different users may prefer natural language queries or keyword-based queries differently. Thirdly, a user query can be a compound sentence. Fourthly, a user query may be fuzzy. Finally, when a user queries, he or she may add or lose some characters, even there are some semantic errors in the query.

Therefore, the existing technology has the defects as the follows.

As to the situations above, the drawbacks of the existing solutions are summarized as follows.

Google, Yahoo and Mobile Info Search are serviced as keyword-based search engines and cannot process natural language queries.

Although Answers Anywhere provides natural language queries, it cannot process indirect queries and compound sentences flexibly. Moreover, the capacity of fizz processing and semantic error analysis is very weak.

Patent US 23002161587A1 only provides an English natural language interface, but it only considers parts of speech and doesn't consider richer semantic information. So it is limited in processing fuzzy queries and user queries with semantic errors.

Patent CN 1466367A is a Chinese question-answering system, and it cannot process compound sentences, keyword queries and queries with semantic errors.

SUMMARY OF THE INVENTION

Therefore, the present invention has been made in view of the above problems. It is an object of this invention to provide a system for performing location query by using a location ontology base and a location query language base, and a method thereof. The Location ontology base provides rich semantic knowledge about local information. Location query language base provides language rules used to analyze natural language queries and keyword-based queries.

According to the first aspect of the present invention, it is provided a natural language based location query system, comprising: a receiving device which receives a request for natural language query from a user terminal;

an access device which accesses a location ontology base and a location query language base that are external to the system or internal in the system, wherein the location ontology base comprising knowledge descriptions about the field of a location service, and the location query language base comprising a language model for the location service query;

a natural language query processing device which performs at least one of a fuzzy processing and an indirection processing on the received request for natural language query by searching the location ontology base and the location query language base with the access device, and retrieves location information corresponding to the request from a location database; and a sending device which sends the location information to the user terminal.

According to the second aspect of the present invention, it is provided a natural language based location query method, comprises:

a receiving step of receiving a request for natural language query sent from a user terminal;

a natural language query processing step of performing at least one of a fuzzy processing and an indirection processing on the received request for natural language query by searching a location ontology base and a location query language base, and retrieves location information corresponding to the request from a location database; and a transmitting step of sending the location information to the user terminal.

According to the third aspect of the present invention, it is provided a keyword based location query system, comprises:

a receiving device which receives a request for keyword query from a user terminal;

an access device which accesses a location ontology base and a location query language base that are external to the system or internal in the system, wherein the location ontology base comprising knowledge descriptions about the field of a location service, and the location query language base comprising a language model for the location service query;

a keyword query processing device which performs at least one of a fuzzy processing and an indirection processing on the received request for natural language query by searching the location ontology base and the location query language base with the access device, retrieves location information corresponding to the request from a location database; and a sending device which sends the location information to the user terminal.

According to the fourth aspect of the present invention, it is provided a keyword based location query method, comprises:

a receiving step of receiving a request for keyword query from a user terminal;

a keyword query processing step of performing at least one of a fit processing and an indirection processing on a request for keyword query sent from a user terminal by searching the location ontology base and the location query language base that are external to the system or internal in the system; and retrieving location information corresponding to the request from a location database; and a transmitting step of sending the location information to the user terminal. According to the fifth aspect of the present invention, it is provided a natural language based and keyword based location query system, comprises:

an access device which accesses a location ontology base and a location query language base that are external to the system or internal in the system, wherein the location ontology base comprising knowledge descriptions about the field of a location service, and the location query language base comprising a language model for the location service query;

a processing device which performs at least one of a processing and an indirection processing on the natural language and/or keyword query request sent from a user terminal by searching the location ontology base and the location query language base with the access device; and retrieves location information corresponding to the request from a location database; and a sending device which sends the location information to the user terminal.

According to the sixth aspect of the present invention, it is provided a natural language based and keyword based location query method, comprises:

a determining step of determining whether a request received from a user terminal is a request for natural language query or a request for keyword query;

if the request is a request for natural language query, then the method comprising a natural language query processing step of performing at least one of a fuzzy processing and an indirection processing on the request for natural language query sent from the user terminal by searching the location ontology base and the location query language base; and retrieving location information corresponding to the request from a location database; and a first transmitting step of sending the location information to the user terminal;

if the request is a request for keyword query, then the method comprising a keyword query processing step of performing at least one of a fuzzy processing and an indirection processing on a request for keyword query sent from a user terminal by searching the location ontology base and the location query language base; retrieving location information corresponding to the request form a location database; and a second transmitting step of sending the location information to the user terminal.

Moreover, the natural language based location query system according to the first aspect of the present invention performs compound sentence analysis and error diagnosis processing with respect to a query including semantic error. The keyword based location query system according to the second aspect of the present invention performs error diagnosis processing.

Therefore, the natural language based location query system according to the present invention not only executes the processing of a compound sentence query, an indirect query and a fuzzy query, but also the processing of the query having semantic error. The keyword based location query system according to the present invention not only executes the processing of an indirect query and a fuzzy query, but also the processing of the query having semantic error. The natural language based and keyword based location query system according to the present invention allows a user to access the same interface by using natural language or keyword. Hence, it is more flexible to provide the user the needed location information, and also provides it more accurately and concisely according to the user's preference and demand, meanwhile the freedom of query is improved and the defects in the current searching system is overcome.

BRIEF DESCRIPTION OF THE DRAWINGS

These and various other features as well as advantages which characterize the present invention will be apparent from reading the following detailed description and a review of the associated drawings.

FIG. 5*b* shows an example of a category table and an entity table in the location ontology base according to this invention.

FIG. 5*c* shows an example of a concept part in the location ontology base according to this invention.

FIG. 5*d* shows an example of an attribute part and a relation part in the location ontology base according to this invention.

FIG. 5*e* is an example of an axiom part in the location ontology base according to this invention.

FIG. 6 shows a schematic structure of a location query language base according to this invention.

FIG. 8 shows a schematic block diagram of an answer template according to this invention.

DETAILED DESCRIPTION OF THE PREFERRED EMBODIMENTS

Hereinafter, a preferred embodiment of the present invention will be described with reference to the accompanying drawings. The same numbers are used throughout the Figures to reference like components and features. Also, in the following description of the present invention, a detailed description of known functions and configurations incorporated herein will be omitted when it may make the subject matter of the present invention rather unclear.

Figure 1:
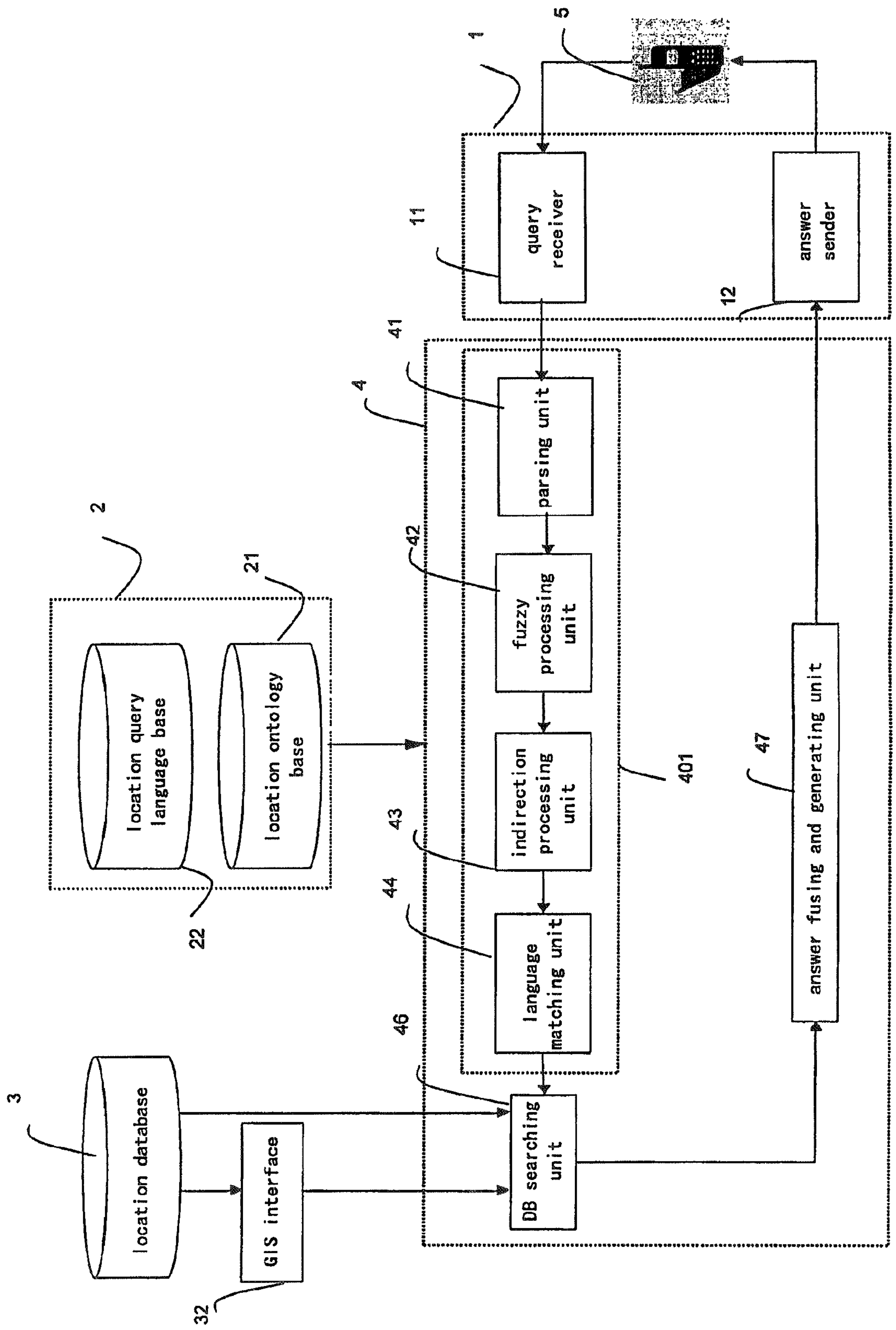
FIG. 1 is a schematic block diagram of a natural language based location query system according to this invention.

FIG. 1 shows a block diagram of a natural language based location query system according to this invention. Referring to FIG. 1, the location query system 1 comprises a user interface 1, a storing unit 2, a location database 3, a GIS interface 32 and natural language query processing means 4.

The location database 3 includes detail data of all geographical entities in location services and it stores the spatial information and general information of the location services. The spatial information includes the location tags of all entities in a map. A point is described using a longitude and latitude. A road or region is described as a sequence of points, and each point is described as a longitude and latitude. General information includes the static information (e.g. address, phone number and product/service information) of all entities. The location database 3 can be generated from an electronic map, yellow pages, and a list of influential knowledge sources The GIS interface 32 is used to calculate the spatial information of the location database. The GIS interface 32 is implemented by GIS functions. At present, popular GIS (Geographic Information System) platform includes Supermap, Mapinfo, ArcInfo, etc. Based on the spatial locations, GIS functions are used to calculate and acquire spatial information (e.g. spatial position and neighborhood information). A GIS function is defined as FuncName ($p_1$,$p_2$, . . . $p_m$), where FuncName is the name of GIS function, and $p_1$, $p_2$, . . . $p_m$ are parameters. Some examples of GIS functions as follows:

1. GISLocation(X) is used as the GIS location function to find the spatial location of X. For example, the value of "GISLocation (Hailong Plaza)" is "137 meters southwest to Zhongguancun Street, and 580 meters northeast to Haidian Middle Street".
2. GISNear(X, Y, Z) is used as the GIS neighborhood function to find the neighborhood information of an aiming location. For example, "GISNear (Innovation Plaza, Bank, 500)" is to find the banks located less than 500 meters from Innovation Plaza.
3. GISPath(X, Y, Z, P) is used as the GIS path planning function to find the nearest/fastest path from Point X to Point Y based on real-time information or historical traffic information and traffic rule. X is a start point, and Y is an end point. Z is a sequence of via points, and P is a traffic way, such as "Driving" or "Bus".

Figure 5A:
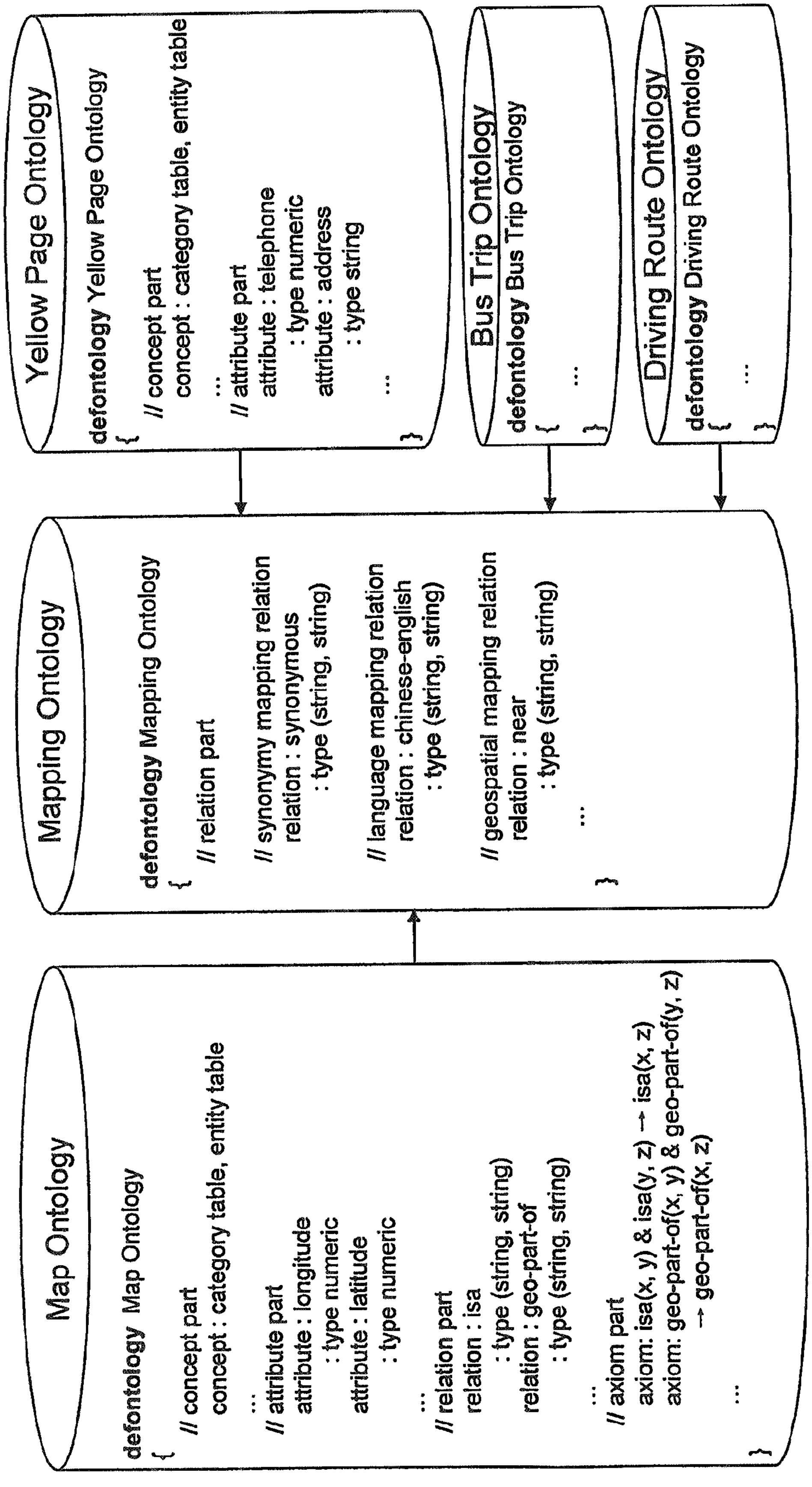
FIG. 5*a* is a schematic structure of a location ontology base according to this invention.

The user interface 1 comprises a query receiver 11 and an answer transmitter 12. A user sends, to the location query system through the query receiver 11, a request for natural language query from a mobile terminal 5, and receives the query result by the answer transmitter 12. The mobile terminal 5 can query location information via SMS, MMS, WAP and voice. The user can also query location information through WEB mode. Moreover, the present invention is not limited to the mobile terminal 5. Some other terminals which can query location information are also used by the present invention. The storing unit 2 stores a location ontology base 21 and a location query language base 22. The location ontology base 21 includes the domain knowledge for processing a location query, as FIG. 5*a* shown. The location query language base 22 includes a language model for processing a location query. FIG. 6 shows the schematic structure of the location query language base.

The location ontology base and the location query language base will be illustrated in detail in the following paragraphs. The natural language query processing means 4 comprises a natural language query analyzing means 401, a DB searching unit 46, an answer fusing and generating unit 47 and an access unit (not shown). The access unit is disposed between the natural language query analyzing means 401 and the storing unit 2, which is used to provide the access to the location ontology base 21 and the location query language base 22. The natural language query analyzing means 401 processes the request for natural language query from a user with the access unit accessing the location ontology base 21 and the location query language base 22, and returns a query action. The natural language query analyzing means 401 comprises a parsing unit 41, a fuzzy processing unit 42, an indirection processing unit 43 and a language matching unit 44. The natural language query processing means 4 processes the natural language query received from the user and sends the searching result to the user interface 1.

After the request for natural language user query is received from the user interface 1, the parsing unit 41 of the natural language query analyzing means 401 parses the request for natural language query by a category table (which is used to describe all the geographic categories of the location ontology base), a entity table (which is used to describe all the geographic entities of the location ontology base) and a constant table in the location query language base, which are accessed by the access unit. Therefore, the syntax characteristics of the request for query are obtained. The fuzzy processing unit 42 performs process regarding to the fuzzy description comprising redundancy description and incomplete description based on the obtained syntax characteristics.

The ways adopted by the process includes (1) the identification of the redundancy word and the process thereof. (2) complementary of useful characters and words. (3) using the context-aware technology based on the query history of the user, etc. The indirection processing unit 43 searches a category name corresponding to the indirect description from the synonymous words of the category table in the location ontology base by using the access unit, if the query request includes an indirect description. The language matching unit 44 matches the query request of the user and the query language of the query language base. Therefore, the query action is thus obtained.

Figure 7:
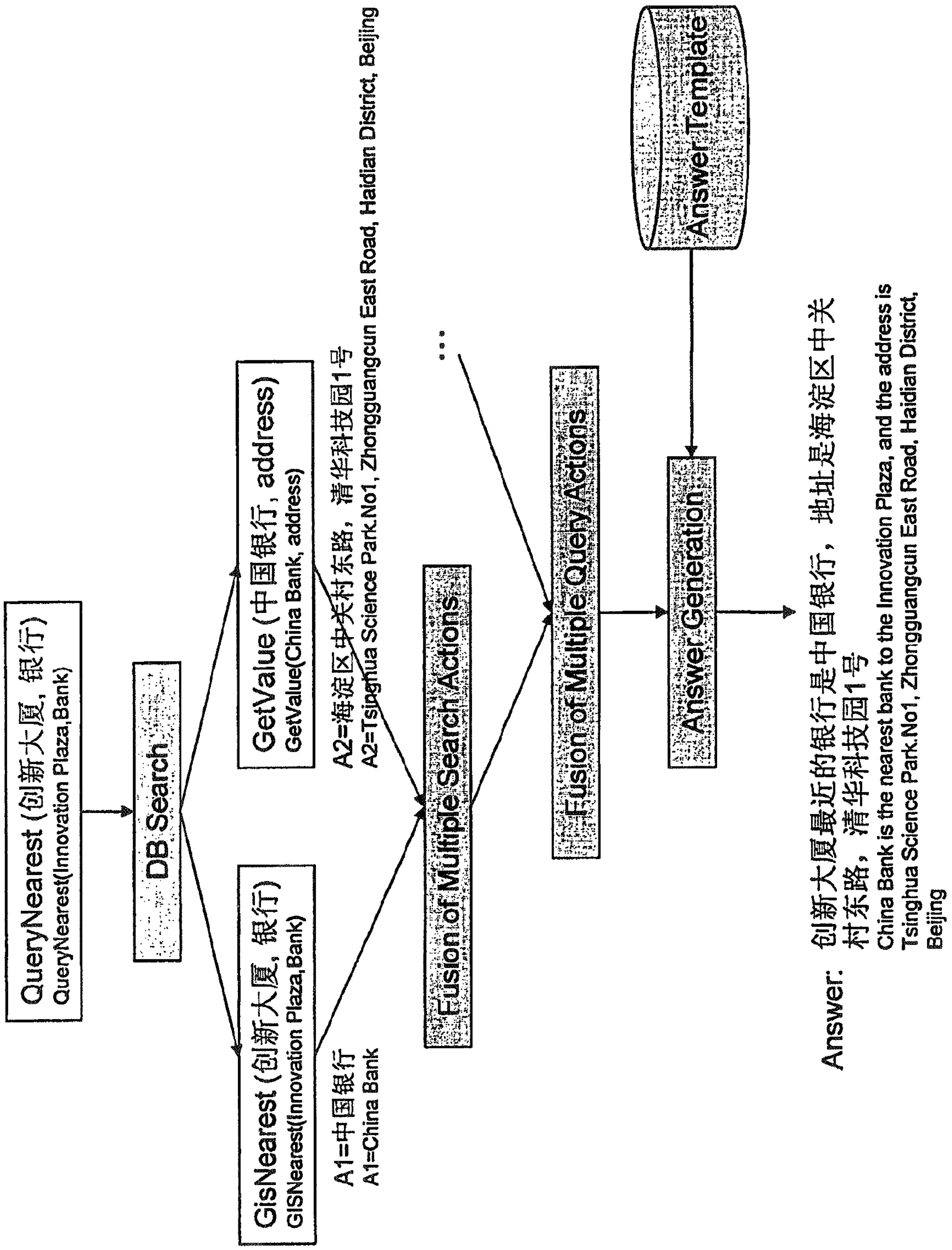
FIG. 7 shows a schematic block diagram illustrating an answer fusing and generating unit which fuses the query result to generate an answer.

Thereafter, the DB searching unit 46 directly searches the location base 3 or indirectly searches the location base 3 so as to find the corresponding location information according to the obtained query action. The answer fusing and generating unit 47 fuses the retrieved location information and generates a test query answer according to an answer temple such as FIG. 8 shown, then sends it to the mobile terminal 5 via the user interface 1. FIG. 7 shows an example of fusing and generating an answer by means of the answer fusing and generating unit 47 according to the present invention.

Although FIG. 1 shows that the location ontology base 21 and the location query language base 22 are arranged inside the location query system, it is obvious for those skilled in the art that the location ontology base 21 and the location query language base 22 can be arranged outside the location query system. Therefore, the location query system analyzes and processes a natural language query by means of the access unit to access the location ontology base 21 and the location query language base 22. In the example of FIG. 1, the natural language query analyzing means 401 can performs both the fuzzy process and the indirect process. But it is obvious that the natural language query analyzing means may only comprise one of the fuzzy processing unit and the indirection processing unit, therefore, the natural language query analyzing means may only perform one of the fuzzy process and the indirect process.

Since the process on the natural language query request or the indirect natural language query request is implemented by means of the new location ontology base 21 and the location query language base 22 of the present invention, the location ontology base and the location query language base will be illustrated with reference to FIG. 5*a* to FIG. 5*f* and FIG. 6. Thereafter, the location search process performed by the location query system will also be described using the location ontology base and the location query language base.

FIG. 5*a* shows a schematic structure of a location ontology base according to this invention. As FIG. 5 shows, the location ontology base generally comprises a group of domain ontologies and a mapping ontology. For each domain, there is a domain ontology that is used to save the knowledge for the domain, e.g. map ontology corresponds to map domain, and yellow page ontology corresponds to yellow page domain. Mapping ontology saves the relations among the concepts of different domains.

Domain ontology comprises four parts: a concept part, an attribute part, a relationship part and an axiom part.

(1) Concept Part

The concept part is used to describe all of the geographic entities and geographic categories of current domain, and they are saved in the category table and entity table. FIG. 5*b* shows an example of a category table and an entity table. As FIG. 5*b* shows, for each category table, it is represented as (name, type, parent, synonymous words). The type of the category is divided into three levels from coarse to fine: basic category, extendable category and chain store. The basic category in the three types is one of the biggest classifications of local information, such as restaurant, school and plaza. The extendable category is the extension or fine description of the basic category (e.g. "fast food restaurant" belongs to "restaurant"). The chain store is the most specific category (e.g. "KFC" belongs to "fast food restaurant"). Parent in the category table is used to describe the hierarchical relation among the categories. For example, the parent of "KFC" is "fast food restaurant". Moreover, each category is summarized to some synonymous words because a large amount of words may have the same meaning. For example, for the category of "restaurant", the synonymous words thereof may be a café, something to eat, etc. the synonymous words of each category may, for example, are English synonymous words.

As the entity table shown by FIG. 5*b*, an entity is a specific place. Each entity is represented as (name, parent), wherein the "parent" denotes the hierarchical relation between the entity and the category. Each entity belongs to a category. For example, KFC Zhongguancun Store (entity) belongs to KFC (category). All the entities are defined into the entity table.

(2) Attribute Part

Attributes define the feature of each of the concepts, which is used to describe the attribute of geographic entities. For example, address and telephone, etc. Each attribute (or relation) has at least one facet ':type' indicates that the type of an attribute, such as the type of the telephone is numeric.

(3) Relation Part

Relations describes different kinds of association among the concepts, which defines the syntax relations and the spatial relations. For example, is a (x, y) is used to describe the hierarchical relationship among categories and entities, and among entities. That is to say, x belongs to y. For example, "is a (KFC, fast restaurant)" denotes that "KFC" belongs to "fast restaurant". Another example is that geo-part-of (x, y) is to describe that x is geographically a part of y. For example, NEC Labs China (x) is a geographic part of the Innovation plaza (y) (because NEC Labs China is located in the Innovation plaza). Each attribute or relation defines an aspect of a concept, and several attributes and relations describe an integrated view of the concept.

(4) Axiom Part

Axiom part is rules based on the concepts and the relations. Therefore, a further deduce is performed. For example, for the axiom geo-part-of (x, y) & south-of (y, z)→south-of (x, z), it can be deduced that NEC Labs China is south of the Tsinghua University, if NEC Labs China is a geographic part of the Innovation Plaza and the Innovation plaza is south of the Tsinghua University. The number of rules in the axiom part is usually limited. The rules can be expanded if required. The axiom generally is organized and determined manually.

Mapping ontology only copses relation part, which includes synonymy mapping relation, language mapping relation and geospatial mapping relation. These relations describe the associations among the concepts of different domain ontologies.

Synonymy mapping relation denotes the mapping among synonymous words or abbreviate words, e.g. synonymous (Silver Plaza, Silver Tower), where "Silver Plaza" and "Silver Tower" are the entities of map ontology and yellow page ontology respectively.

Language mapping relation denotes the relations among the words that are described in different languages, e.g. Chinese-English (路, Road), where "路"and "Road" are the categories of driving route ontology and map ontology respectively.

Geospatial mapping relation denotes the relations among geospatial-related words, e.g. near (Silver Plaza, Baofusi Station), where "Silver Plazea" and "Baofusi Station" are the entities of map ontology and bus ontology respectively.

FIG. 5*c* shows an example of a concept part in the location ontology base according to this invention. For example, for the category "road", the type thereof is a basic type and the entity belongs to the category "road" is "second ring road". For the category "university", the type thereof is an extendable type, and the entity belongs to the category "university" is "Tsinghua University". For the category "Carrefour", the type thereof is a chain store type, the entity belongs to "Carrefour" is "zhongguancun of Carrefour".

FIG. 5*d* shows an example of an attribute part and a relation part in the location ontology base according to this invention. For example, for "starting point", the type thereof is the attribute of a road, and the example of the attribute value thereof is, for example, "xuezhi bridge". For the "telephone", the type thereof is "attribute", and the attribute value thereof is, for example, 010-62705962, etc. for the is a (x, y), the type thereof is "relation", and the attribute values is, for example "isa(Chinese Bank, Bank)".

FIG. 5*e* is an example of an axiom part in the location ontology base according to this invention. The deduction of the semantic relation and the spatial relation can be performed according to the axiom part shown in FIG. 5*e*.

Figure 5F:
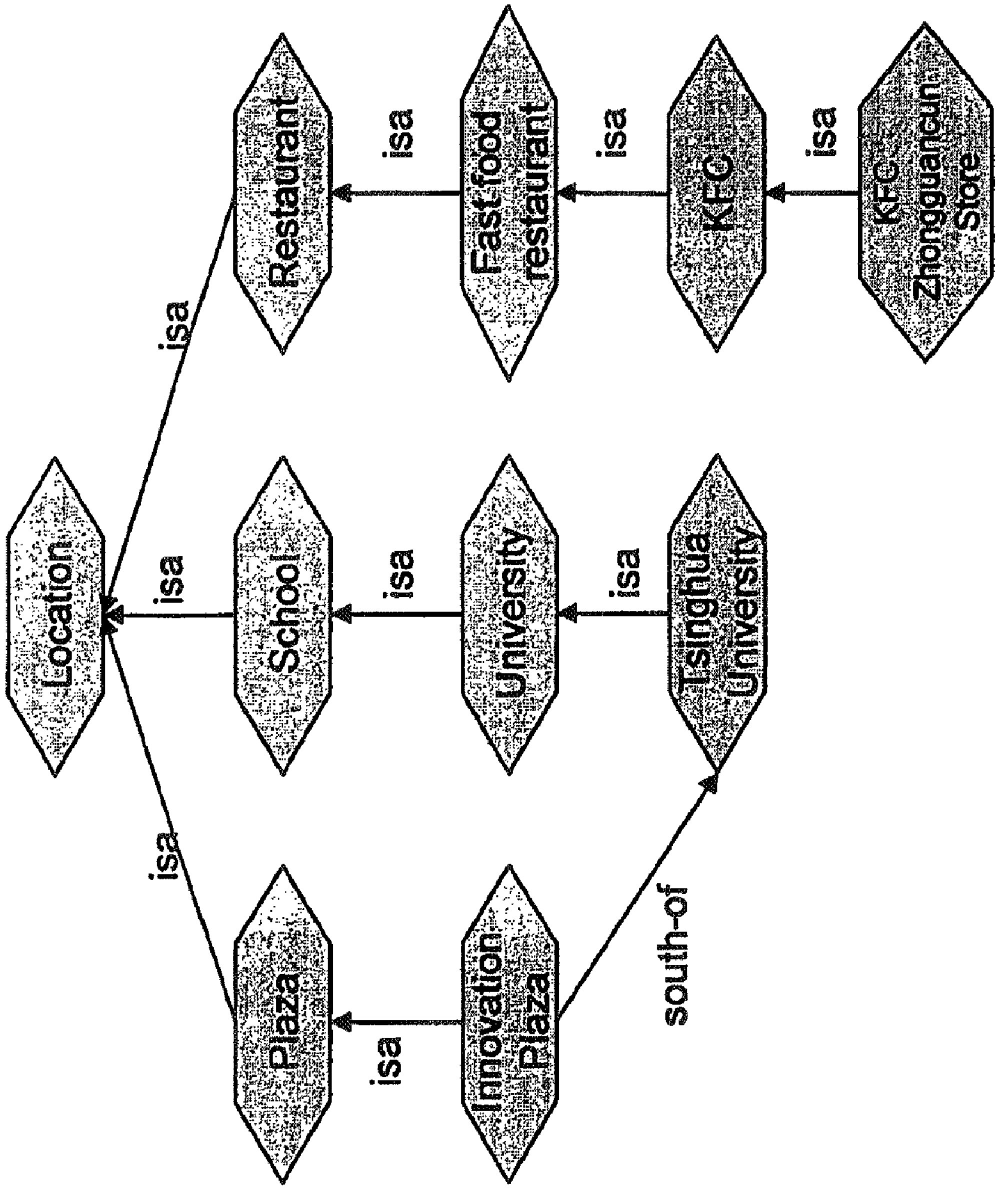
FIG. 5*f* shows a schematic structure of a location concept space of the location ontology base according to this invention.

FIG. 5*f* shows a schematic structure of a location concept space of the location ontology base according to this invention. The concept space is generated automatically according to the category table and the entity table. As FIG. 5*f* shows, the location concept space is composed by a set of concepts (include categories and entities), and the relations among the concepts. The arrows in FIG. 5*f* denote the relations between the starting point (concept) and the terminal point (concept).

Location query language base comprises a group of domain query languages and a common query language. For each domain, there is a domain query language that is used to save the language model for processing the queries for the domain, e.g. map query language corresponds to map domain. Common query language summarizes the common query syntaxes of various domain query languages, and the syntax of common query language can be inherited by the related domain query languages. Therefore, location query language base is organized in a hierarchical manner.

FIG. 6 shows an example of location query language base according to this invention. Domain query language and common query language have the same representation methods, and they all include two parts: a syntax part and an action part.

(1) The syntax part describes all the possible query ways used by users in the location service and provides a grammatical definition system. The syntax description in the syntax part is similar to context-free grammar, and it records all kinds of syntaxes used to parse location query. The syntax part includes a constant table, which comprises the constant definition (including different kinds of noun, verb, and interrogative, etc.) in the syntax. Some special symbols are defined in syntax.

"|" means "or" logical operator.

"<X>" means X is a syntax name, and its definition can be found in Syntax.

"<!X>" means X is a constant type, and it can be replaced with the corresponding words. The definition of X can be found from the constant table, which consists of type, part-of-speech and word set.

"<?X>" means X is a concept, and it can be replaced with any category or entity in the location ontology.

<?X($cons_1$| . . . |$cons_m$)> means X is a concept and $cons_i$ (i=1 . . . m) is a constraint, and X can only be replaced with the concepts that satisfy any one of constraint $cons_i$. For example, <?C1(geo-entity)> can only be replaced with the entities in the location ontology base.

"[ ]" means the content between "[" and "]" is optional in current syntax.

"{<?X>}" is a collection of query variables, and it can match multiple concepts with parallel relation.

"<#X>" means X is a parameter, and it can be appropriated a value by other syntaxes (i.e., the current syntax can be inherited by other syntax using the assigning value of the parameter).

"<X1>=<X2(Y=Z)>" means the syntax of X1 can inherit the syntax of X2 by setting the value of the parameter Y to Z.

(2) The action part describes the query actions corresponding to each query syntax, and defines a set of query processing rules. Each of the rules has a condition and an accompanying action generally to denote that what kind of query action will be generated when a user query matches with a certain syntax. The query action in the action part is the understanding result of the system for the user query.

The query action of each syntax is usually defined manually. For example, "isSyntax(x)" is the most commonly used condition, and it means that whether a user query matches the syntax x.

The location query language has four important features:

1. It can cover lots of queries by only using a few syntaxes.
2. It provides a language model for natural language query analysis and keyword query analysis.
3. It can express compound sentences. "{<?X>}" makes the syntax can match with compound concepts in a query sentence.
4. It can be used to analyze the semantic errors in the user query by comparing the content of a user query with query syntax in the location query language base.

Figure 2:
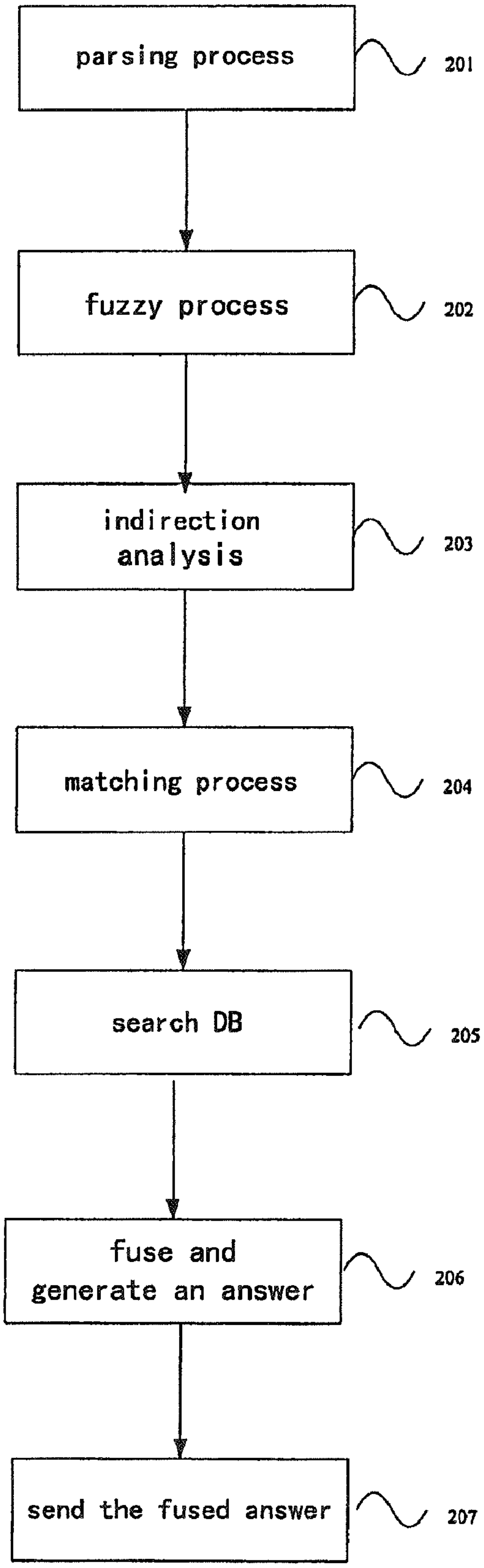
FIG. 2 shows a flow chart of a natural language based location query method according to this invention.

Now the location searching process carried by the location query system will be illustrated with the combination of the location ontology base 21 and the location query language base 22. FIG. 2 shows a flow chart of a natural language based location query method according to this invention.

As FIG. 2 shows, the parsing unit 41 of the natural language query analyzing means 401 parses the natural language query request when the natural language query request of a user is received from the user interface at S201. Specifically, the category table and the entity table of the location ontology base are accessed by the access unit so as to identify the concept from the natural language query request and determine the type thereof. The constant table in the location query language base is searched by the access unit in order to identify the non-concept from the natural language query request and determines the part of speech and the type thereof.

The fuzzy processing unit 42 performs processing on the fuzzy description comprising redundant description and incomplete description based on the syntax characteristics obtained from the parsed sentence (i.e., the parsed query request) at S402. The method used by the fuzzy processing includes (1) identification and processing of redundant words, i.e., deletion of redundant words based on grammar feature (for example, request words, auxiliary words and meaningless adverbs are deleted). (2) Complementing of useful characters and words. For incomplete entities, we present a method based on partial match technology. This invention provides a partial match method to find the whole name. Firstly, find the unrecognized words from the parsing result of the user query. Secondly, divide each unrecognized word in a more fine granularity way based on a commonly used dictionary. Then, get all the entities containing the above word from the location ontology by means of the access unit. In consideration of the mobile terminal, such as the small screen, select the entity with the shortest length if there is a plurality of optional entities. For example when the user queries "Innovation", it will be replaced by "Innovation plaza" because "Innovation" is an incomplete unrecognized word. (3) Context-aware technology based on users' query history. Firstly, check if current query is complete. Secondly, if the query is incomplete, get the latest record from the user's query history and add the lost words.

At S203, the indirection processing unit 43 searches the category name corresponding to the indirect description from the synonymous word in the category table of the location ontology base by means of the access unit.

At S204, the language matching unit 44 matches the query request from the user with the syntax of the query language base, and then gets the query action. The query language match includes: obtaining the syntax fully matches with the user query from the location query language base (need not to conform the order of the words strictly). The query language match can be a top-down matching: it obtains the matched common syntax from the common query language first, and then obtains the matched domain syntax from the domain query languages that inherit above common syntax. If no common syntax is matched, the query is matched with domain query languages directly. The query language match can also be a bottom-up matching: match domain query languages first, and then match common query language. It should be noted that a set of parallel concepts can match "{<?X>}" in Syntax. The action is created for the user query request according to the matched syntax. Further, it needs to deduce based on the location ontology base in the concept constraint determination process. For example, when a certain syntax describes the famous dishes in a restaurant, it should be deduced to obtain that KFC zhongguancun store is a restaurant if the user queries "what kind of famous dishes the KFC zhongguancm store has" and it satisfies the concept constraint of the syntax. The follows will be utilized during the deduce process:

relation: isa(KFC zhongguancun store, KFC)
relation: isa(KFC, fast restaurant)
relation: isa(fast restaurant, restaurant)
axiom: isa(x,y) & isa(y,z)→isa(x,z)

During the matching process of language matching unit 44, if a matched syntax is obtained but the concept constraint of the syntax cannot be satisfied, transform relevant description into the concept that can satisfy above concept constraint. For example, a user queries "银谷大厦到中关村 怎么坐公交(which bus can get to Zhongguancun from Silver Plaza)", the matched syntax is "<?C1(公交车站)>; <!到达介词>; <?C2(公交车站) >; <!怎么疑问词>; [<!乘坐动词>]; <!公交名词>", but "银谷大厦(Silver Plaza)"belongs to the category "大厦(Plaza)" and not "公交车站(Bus Station)", so "银谷大厦(Silver Plaza)" is transformed into "保福寺站(Baofusi Station)", based on the geospatial mapping relation "near (银谷大厦, 保福寺站)" of the mapping ontology of location ontology base.

At S205, the DB searching unit 46 directly searches the location database 3 or indirectly searches the location database using a GIS function, so as to find the corresponding location information. If a user queries a general static information (e.g. address, phone number and product/service information of a company, etc.), the location database 3 will be searched directly. If the user queries the spatial information (e.g. location, neighborhood or route information), the location database will be searched by using the GIS function according to the query action. The corresponding query methods are specified with respect to each query action. For example:

1) QueryLocation(X): If the address value of X is not null, get the value. To give users more location information, GIS function "GISLocation(X)" is also invoked. The value of QuetyLocation(X) consists of A1=GetValue(X, address) and A2=GISLocation(X), wherein GetValue (X, A) denotes that the value of the attribute A of X is obtained. For example, the value of QueryLocation (Hailong Plaza) consists of A1="Zhongguancun Street. NO1" and A2-"137 meters southwest to Zhongguancun Street, 580 meters northeast to Haidian Middle Street".
2) QueryNear(X, Y): There may be many optional entities near X, so we only provide the value of function GIS-Near(X,Y,500).
3) QueryNearest(X, Y): To give users more location information, we also provide the address information besides providing the name of the entity nearest to the X. The value of QueryNearest(X) consists of A1=GISNearest (X)) and A2=GetValue(A1, address). For example, the value of QueryNearest(Innovation, Bank) consists of A1="China Bank" and A2="Tsinghua Science Park.No1, Zhongguangcun East Road, Haidian District, Beijing".
4) QueryPath(X, Y): The user wants to reach Y, so he or she also needs spatial information about Y. The value of QueryPath(X, Y) consists of A1=GISPath(X, Y, NULL, driving) and A2=GISLocation(Y).

The searched results should be fused after the database query is performed, so that the last location query answer is generated. At S206, the answer fusing and generating unit 47 fuses the searched location query answers, wherein the fusing includes fusion of multiple search actions. A query action may contain multiple search actions, so the search actions for each query action should be fused. For example, QueryNearest(X, Y) contains two search actions "GisNearest(X)" and "GetValue(A1, address)". After the answer fusing and generating unit 47 fuses the search actions, the last location query answer is generated using the multilingual answer template defined for each query action and the answer is sent to the mobile terminal for display via a user interface 1. FIG. 7 shows a schematic block diagram illustrating an answer fusing and generating unit which fuses the query result to generate an answer. FIG. 8 shows a schematic block diagram of an answer template according to this invention.

Figure 9A:
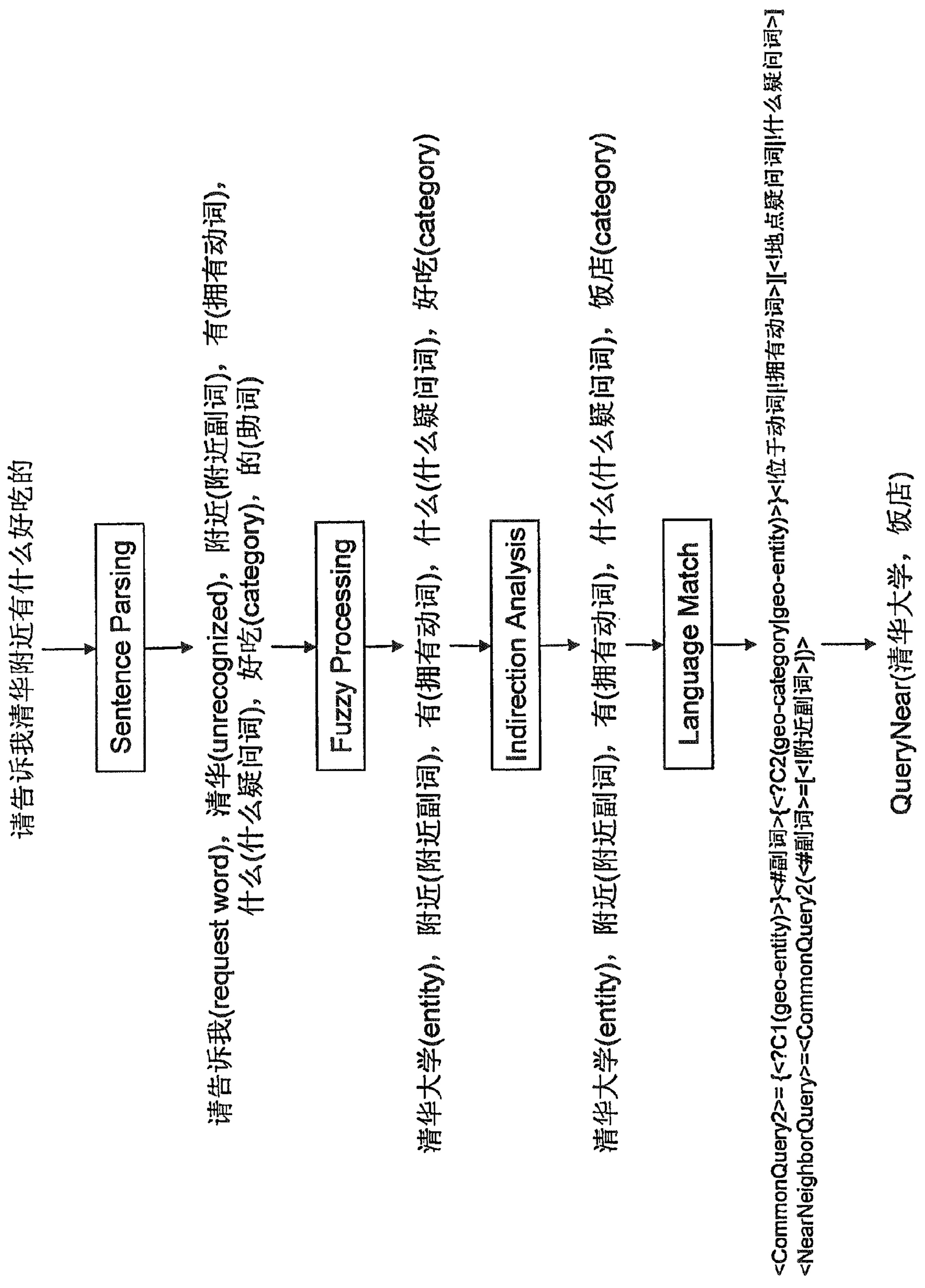
FIG. 9*a* shows an example illustrating the natural language query processing device processes a natural language query according to this invention.
Figure 11A:
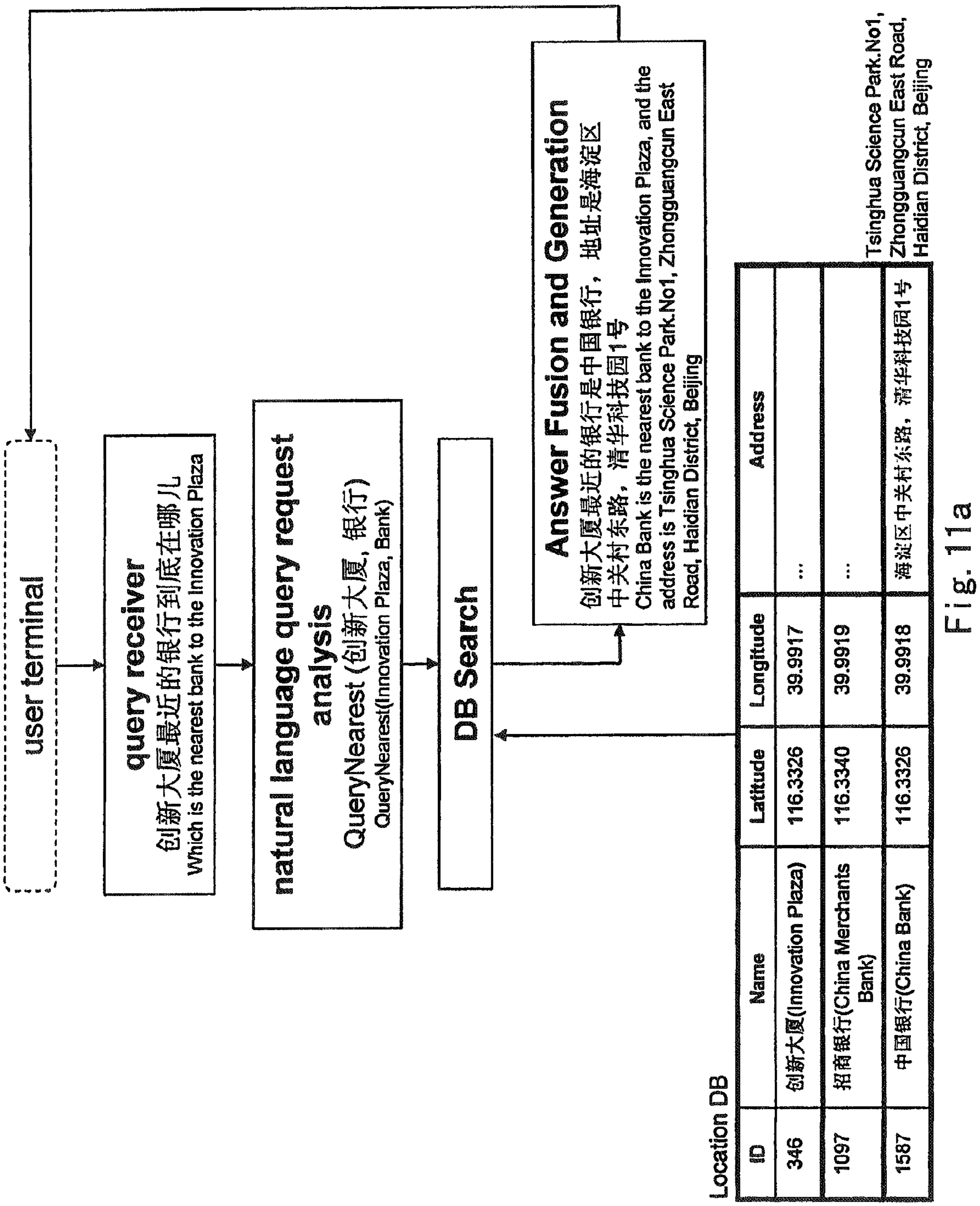
FIG. 11*a* is an example illustrating the natural language based location query system performs a query.

FIG. 9*a* shows an example illustrating the natural language query processing device processes a natural language query according to this invention. Now the location query system of the present invention will be described by the example of the natural language query request "请告诉我 有什么好吃的" (please tell me if there is something to eat near Tsinghua) input by the user. When the natural language query analyzing means 401 receives the query request via the user interface, the parsing unit 41 parses the query request by the access unit accessing the location ontology base 21 and the location query language base: 请告诉我(request word) 清华(unrecognized word) 附近(附近副词) (adverb expressing near a place) 有(拥有动词) (verb expressing having something) 什么(什么(interrogative word related to “what”) 好吃(category) 的(auxiliary word). Then, the fuzzy processing unit 42 performs adding of words or deleting of words process according to the query request being parsed. The request word “请告诉我” (means please tell me) and the auxiliary word “的” are deleted, and the word “大学” (university) is supplemented to the word “清华” (Tsinghua) to form the word “清华大” (Tsinghua University) by the access unit accessing the entity table of the location ontology base, therefore, the query request is changed to “清华大(entity) 附近(附近副词) 有(拥有动词) 什么(什么 好吃(category)”. The indirection processing unit 43 performs indirect analysis on the above result, and searches the category table in the location ontology base 21 by means of the access unit. Therefore, the synonymous word of the word “好吃(means something to eat)” is “饭店(restaurant)”. Therefore, the query request “清华大(entity) 附近(附近副词 有(拥有动词) 什么(什么) 好吃(category)”is output to the language matching unit 44. The language matching unit 44 matches the query request of the user with the location query language base 22, so as to find the matched syntax “<NearNeighborQuery>=<CommonQuery2(<#副词>=[<!附近(附近副词>])>”, where <CommonQuery2>={<?C1(geo-entity)>} <# 副词>{<?C2(geo-category|geo-entity)>} [>!位于动词|!拥有动词>] [<!地点疑!什么疑问词>], and generates the query action QueryNear (清华大, 饭店) (QueryNear(Tsinghua University, Restaurant)). The DB searching unit 46 receives the query action and searches the information associated with the query action in the location database directly or indirectly based on the query action. For example, the query result is “六道家常菜饭店, 五道口必胜客餐厅, 五道口肯德基快餐店(Liudaokou Guolin Restaurant, Wudaokou Bishengke Pizza Restaurant and Wudaokou KFC fast food Restaurant)”. The answer fusing and generating unit 47 fuses the search result, therefore, the answer “五道口必胜客餐厅 和肯德基快餐店, 六道口郭林家常菜(Wudaokou Bishengke Pizza Restaurant and KFC fast food Restaurant, and Liudaokou Guolin Restaurant)” is generated. The generated answer is sent to the mobile terminal of the user for display through the user interface 1. FIG. 11*a* shows an example illustrating the natural language based location query system performs a query.

Figure 3:
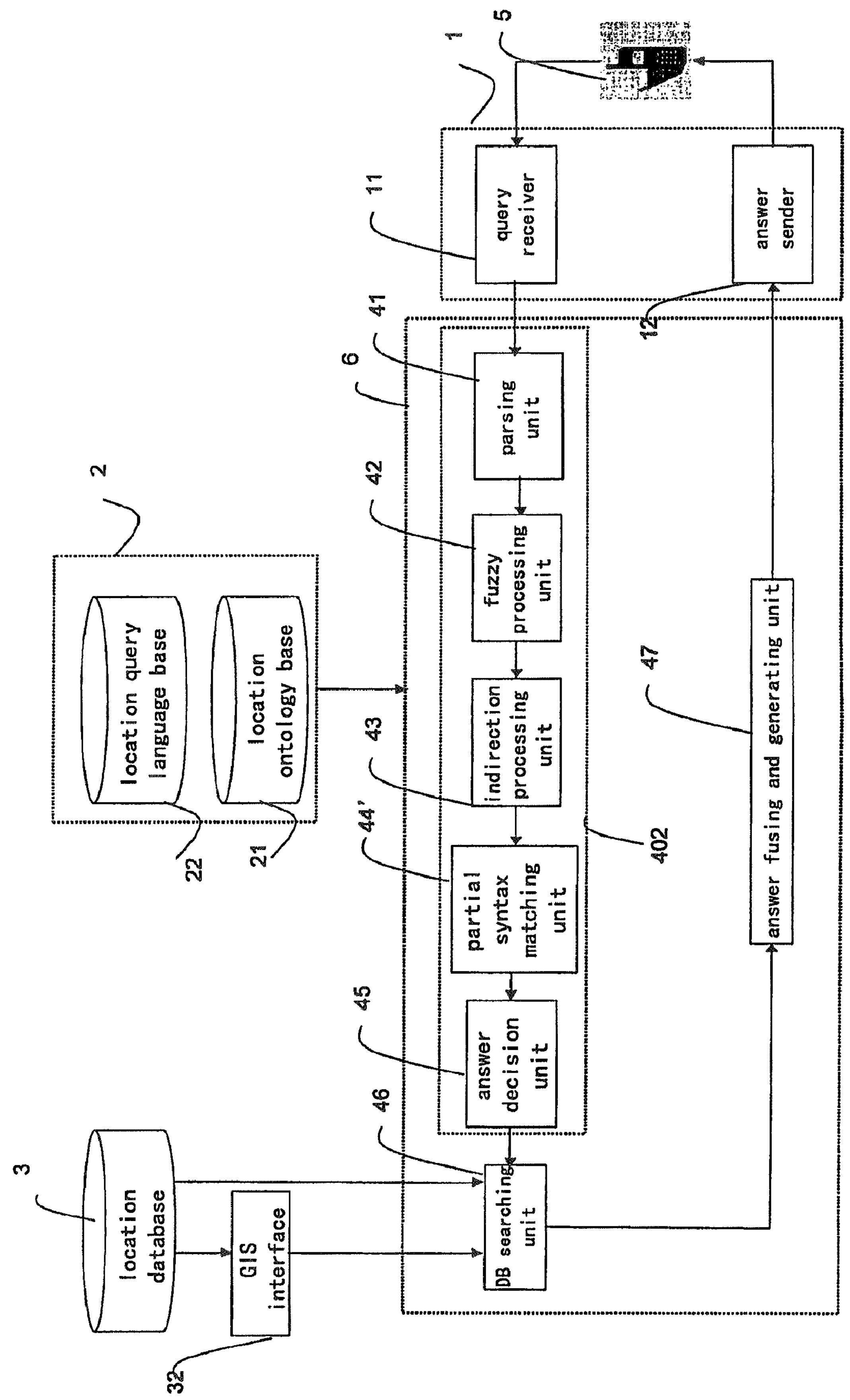
FIG. 3 is a schematic block diagram of a keyword based location query system according to this invention.

FIG. 3 is a schematic block diagram of a keyword based location query system according to this invention. Referring to FIG. 3, the query system includes a user interface 1, a storing unit 2, a location database 3, a GIS interface 32 and keyword query processing means 4. The location database 3 is used for storing the spatial information and general information of the location services. The GIS interface 32 is used to calculate the spatial information of the location database.

The user interface 1 comprises a query receiver 11 and an answer transmitter 12. The storing unit 2 stores a location ontology base 21 and a location query language base 22. The location ontology base 21 contains the knowledge for processing a location query. The location query language base 22 includes a query language model for defining location service.

The keyword query processing means 6 comprises a keyword query analyzing means 402, a DB searching unit 46, an answer fusing and generating unit 47 and an access unit (not shown). The access unit is arranged between the keyword query analyzing means 402 and the storing unit 2, which is used to provide the access to the location ontology base 21 and the location query language base 22 with respect to the keyword query analyzing means 402. The keyword query analyzing means 402 processes the request for keyword query from a user with the access unit accessing the location ontology base 21 and the location query language base 22, and returns a query action. The keyword query analyzing means 402 comprises a parsing unit 41, a fuzzy processing unit 42, an indirection processing unit 43, a partial syntax matching unit 44' and an answer decision unit 45.

The parsing unit 41 of the keyword query analyzing means 402 parses the keyword query request of the user. Specifically, the category table and the entity table of the location ontology base are accessed by the access unit so as to identify the concept from the keyword query request and determine the type thereof. The constant table in the location query language base is searched by the access unit so as to identify the non-concept from the keyword query request and determines the part of speech and the type thereof.

The fuzzy processing unit 42 performs fit process on the received keyword query quest regarding to the fuzzy description comprising redundancy description and incomplete description. The ways adopted by the fuzzy process includes (1) identification and process of redundant words, i.e., deletion of redundant words based on grammar feature (for example, request words, auxiliary words and meaningless adverbs). (2) complementing of useful characters and words. (2) Complementing of useful characters and words. When a user inputs a keyword, some characters may be lost. We present a method based on partial match technology to find the whole name. Firstly, if the unrecognized words is appeared from the parsing result, a more fine granularity parsing will be performed on the keyword based on a constant dictionary. Then, get all the entities containing the above words from the location ontology by means of the access unit. For example when the user queries “海龙大厦 存钱啊(Hailong Plaza; save money)”, the parsing unit 41 obtains the result “海龙(unrecognized word) 存钱(category) 啊(Exclamation)”. Because the word “海龙” is an unrecognized word, it is reparsing to obtain the result “海龙 (Hailong; Plaza)”. Then the access unit searches the location ontology base. It is found that the word “海龙电子大厦 (Hailong Electronic Plaza)” contains the word “海龙(Hailong)” and “大厦(Plaza)”, and the partial match is successfully performed. In consideration of the mobile terminal, such as the small screen, select the entity with the shortest length if there is a plurality of optional entities.

The indirection processing unit 43 searches a category name corresponding to the indirect description from the synonymous words of the category table in the location ontology base by using the access unit, if the query request includes an indirect description.

The partial syntax matching unit 44' obtains the syntax set matched with the query part of the user (not fully matched) by using the access unit to access the location query language base. It includes the syntax of all the keyword contained in the user query searched from the location query language base. It should be noted that a group of parallel concept may match with the “{<?X>}” of the matching syntax.

The answer decision unit 45 selects the optimum match according to a predetermined decision rule and generates query action or interacts with the user. When a user searches using keyword, a plurality of syntaxes may be matched partially and such plurality of syntaxes may have the same action. Therefore, the redundant syntaxes need to be deleted so as to determine the final answer. If the syntax is fully matched with the query, the syntax is selected and the corresponding action is generated. If the syntax is not fully matched with the query but having several syntaxes containing all the keyword of the query, the optimum resolution (the optimum answer) will be determined by the matching degree.

If a syntax has the highest matching degree that is far greater than others, such syntax is selected and a corresponding action is created. Otherwise, all possible queries will be generated, and the user himself will make a choice by the interacting with the system.

Similar to the language matching unit 44 of natural language query analyzing, the answer decision unit 45 also transforms the description that don't satisfy the concept constraint of the matched syntax, by searching the mapping ontology of location ontology base.

Although FIG. 3 shows that the location ontology base 21 and the location query language base 22 are arranged inside the location query system, it is obvious for those skilled in the art that the location ontology base 21 and the location query language base 22 can be arranged outside the location query system. Therefore, the location query system analyzes and processes a keyword query by means of the access unit accessing the outside location ontology base 21 and the location query language base 22. In the example of FIG. 3, the keyword query analyzing means 402 can performs both the fuzzy process and the indirect process. But it is obvious that the keyword query analyzing means may only comprise one of the processing unit and the indirection processing unit. Therefore, the keyword query analyzing means may only perform one of the fuzzy process and the indirect process.

Figure 4:
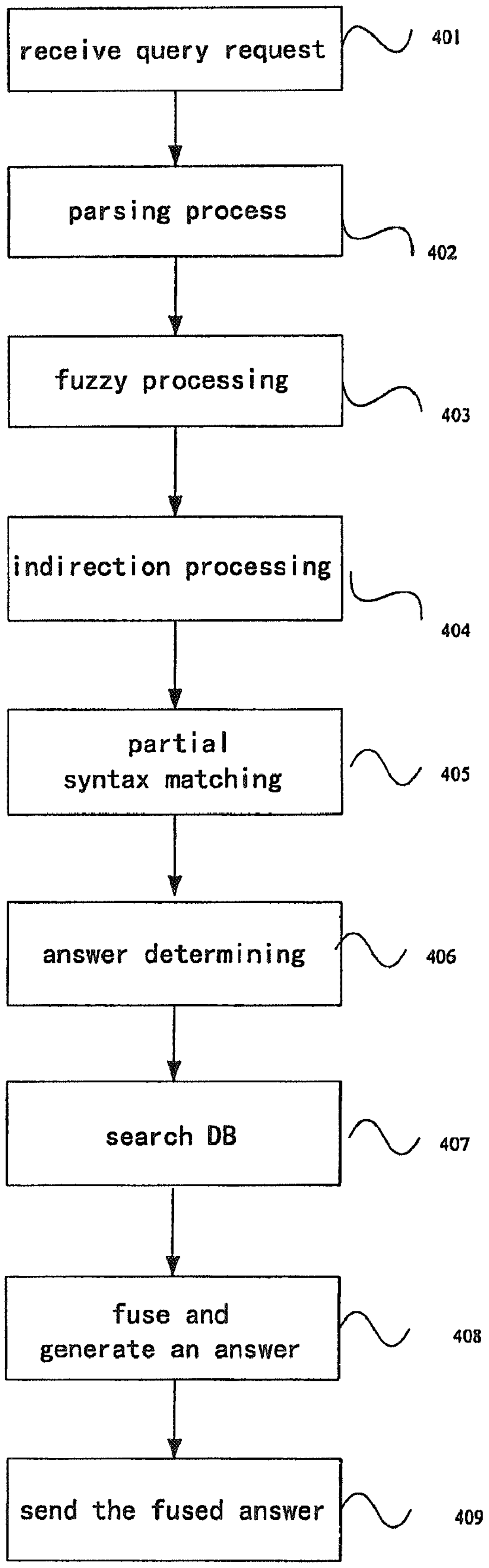
FIG. 4 shows a flow chart of a keyword based location query method according to this invention.

FIG. 4 shows a flow chart of a keyword based location query method according to this invention. The keyword base location query system receives the keyword query request sent from the mobile terminal 5 of a user at S401.

The parsing unit 41 parses the received query request at S402. The parsing unit 41 identifies the concept form the keyword query request and determines the type thereof by means of the access unit accessing the category table and the entity table of the location ontology base 21, and identify the non-concept from the natural language query request and determines the part of speech and the type thereof by the access unit searching the constant table in the location query language base 22. More characteristics of the syntax will be analyzed by the location ontology base 21 and the location query language base 22, thus the search is performed more accurately.

The fuzzy processing unit 43 utilizes the characteristic of syntax obtained form the parsed sentence to perform fuzzy processing on the fuzzy description comprising redundant description and incomplete description contained in the query request of the user at S403 (including the identification and process of redundant words, and determination and complementing of incomplete word and the context-aware technology, etc).

The indirection processing unit 43 searches the category name corresponding to the indirect description of the keyword query from the category table of the location ontology base 21 by means of the access unit at S404.

The partial syntax matching unit 44' matches the query request with the location query language by the access unit so as to obtain the matched syntax set at S405.

The answer decision unit 45 selects the optimum matched syntax from the matched syntax set according to a predetermined decision rule and generates a query action, or generates all possible queries to ask the user to select by interacting with the location query system, and generates the corresponding query action according to the user's selection at S406.

Then, the DB searching unit 46 directly searches the location database 3 or utilizes the GIS interface to search the location database 3, so as to find the location corresponding to the query request of the user at S407.

The answer fusing and generating unit 47 fuses the searched location information and generates an answer at S408.

The answer fusing and generating unit 47 sends the answer to the mobile terminal 5 for display via the user interface 1 at S409.

Figure 10:
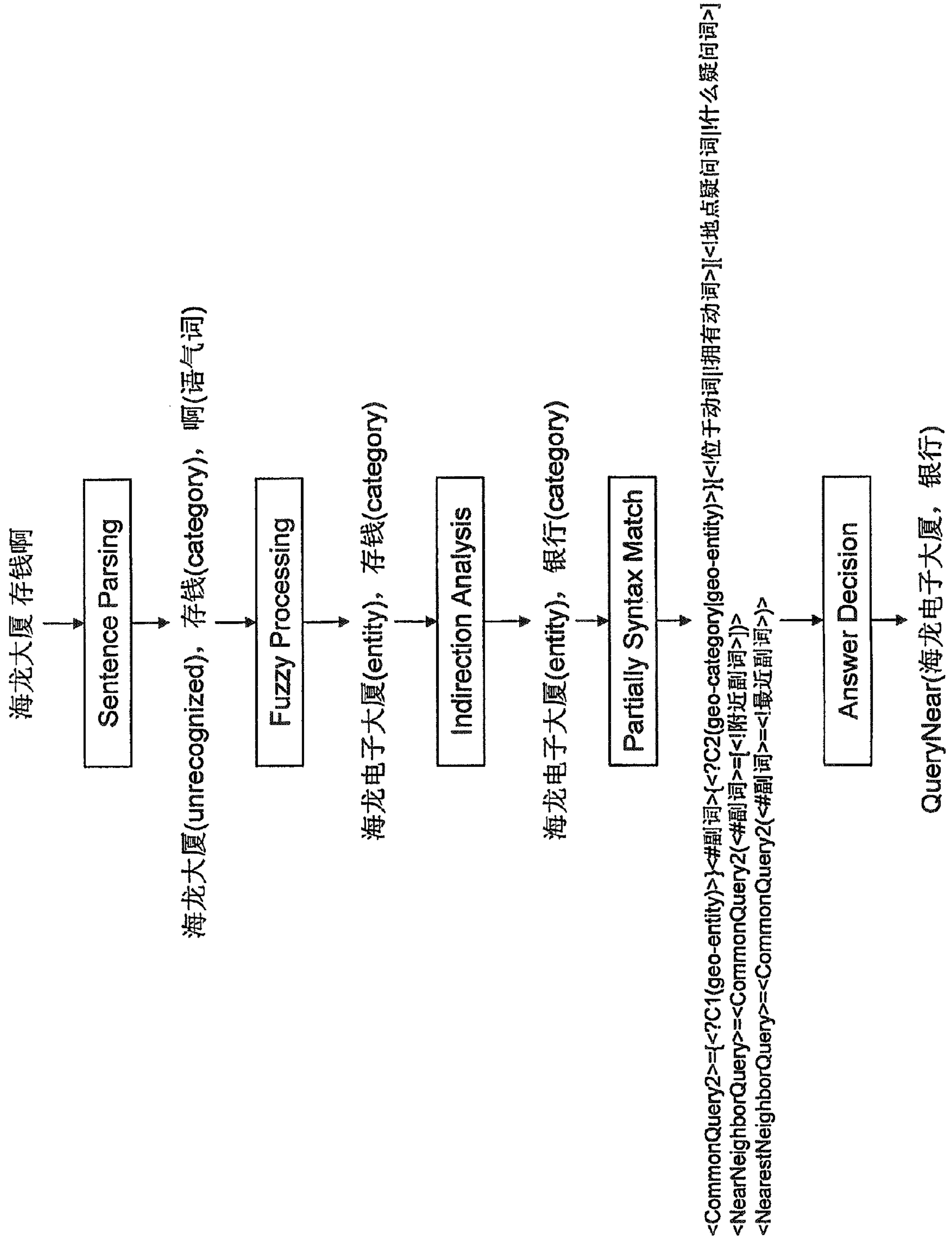
FIG. 10 shows an example illustrating the keyword query processing device processes a keyword query according to this invention.

FIG. 10 shows an example illustrating the keyword query processing device processes a keyword query according to this invention. For example, when the query request of the user is "海龙大厦 存钱啊 (Hailong Plaza; save money)", the parsing unit 41 parses the query request by means of the access unit to access the location ontology base 21 and the location query language base 22. The result is " 海龙(unrecognized word) 存钱(category) 啊(Exclamation)". Thereafter, the processing unit 42 deletes the word "啊" and complements the word " 海龙(Hailong Plaza)" to "海龙电子大厦(Hailong Electronic Plaza)" by the access unit accessing the location ontology base 21 and the location query language base 22. The indirection processing unit 43 searches the category table by the access unit to access the location ontology base 21 and converts the indirect description "存钱(save money)" to a direct description "银行 (Bank)", so as to obtain the keyword "海龙电子大厦(entity) 银行(category)". Then the partial syntax matching unit 44' finds the matched syntax from the location query language, which includes:

<CommonQuery2>={<?C1 (geo-entity)>}<#副词>{<?C2 (geo-category |geo-entity)>}[<! 位于动词! 拥有动词>] [<! 地点疑! 什么疑问词>]

<NearNeighborQuery>=<CommonQuery2(<#副词>= [<! 附近(附近副词>])

<NearestNeighborQuery>=<CommonQuery2 (<#副词>=<! 最近副词>).

Figure 11B:
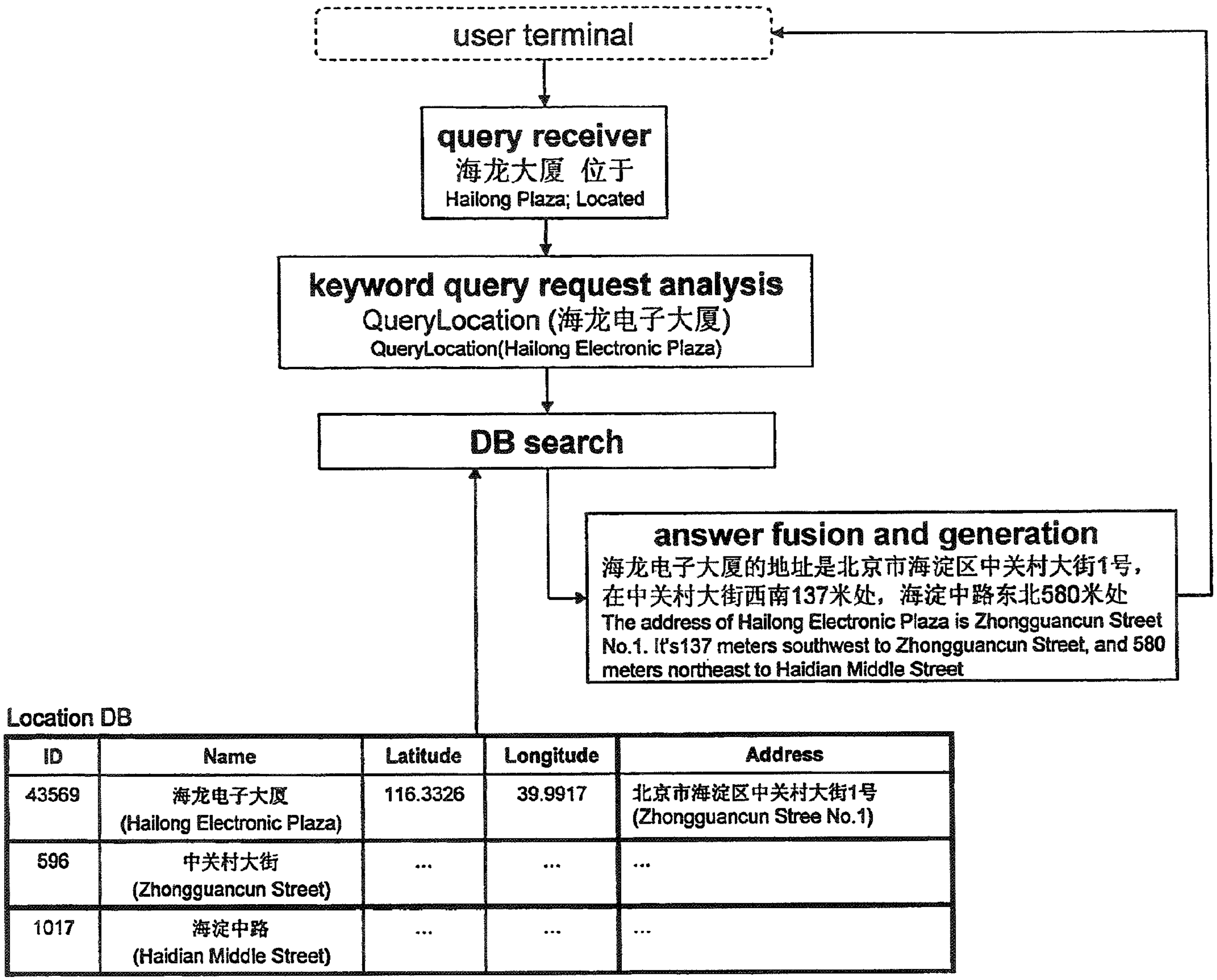
FIG. 11*b* is an example illustrating the keyword based location query system performs a query.

The answer decision unit 45 selects the syntax of the <NearNeighborQuery> because it can fully match with the query. The corresponding query action QueryNear(海龙电子大厦, 银行) (QueryNear(Hailong Electronic Plaza, Bank)) is generated. The DB searching unit 46 searches the location information in the location database 3. Then the answer fusing and generating unit 47 fuses the searched location information, generates the final answer. The answer will be sent to the mobile terminal 5 for display via the user interface 1. FIG. 11*b* is an example illustrating the keyword based location query system performs a query.

Figure 12:
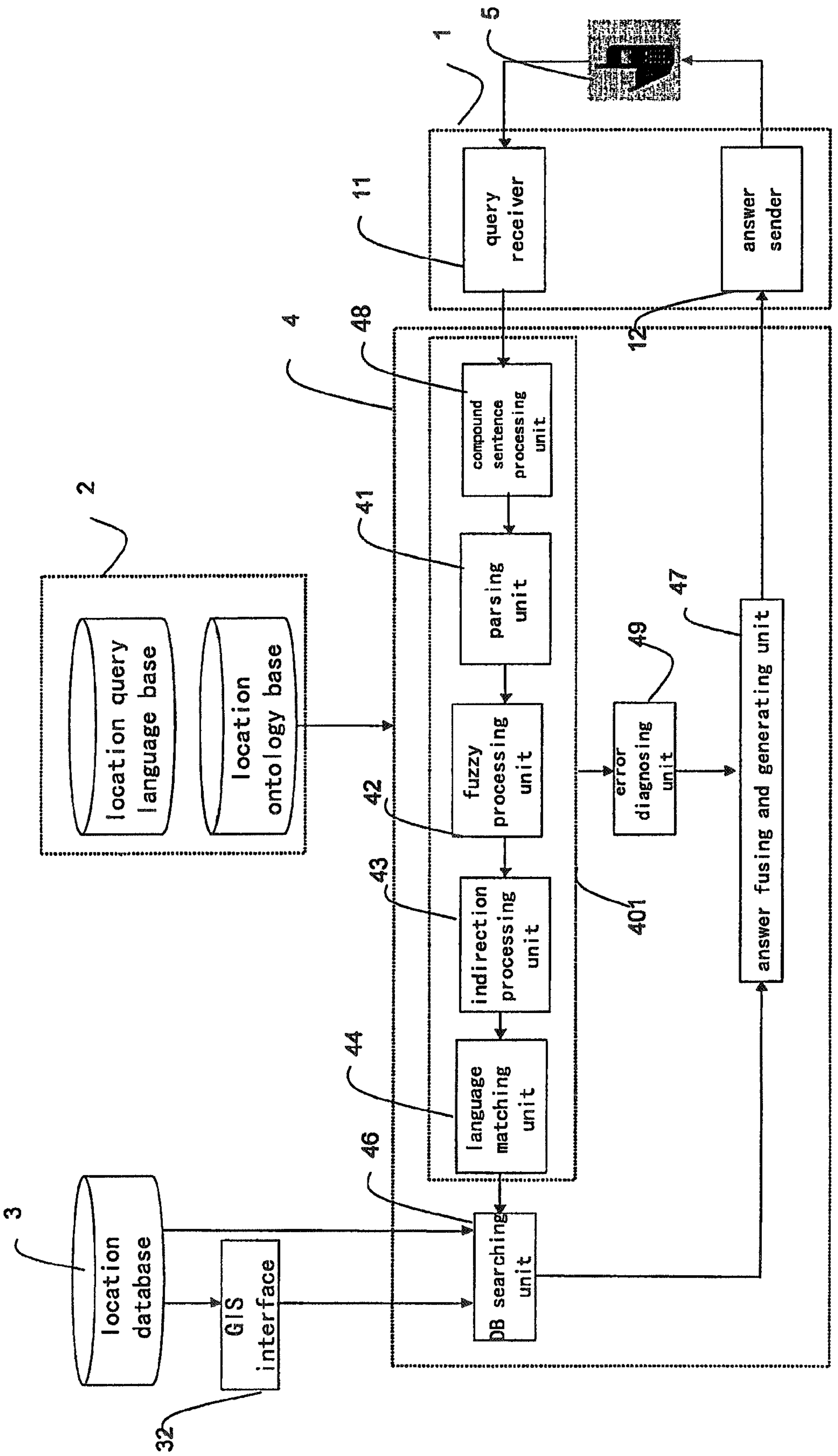
FIG. 12 is another embodiment of the natural language based location query system according to this invention.

FIG. 12 is another embodiment of the natural language based location query system according to this invention. The difference compared with that of FIG. 1 is that the location query system also comprises a compound sentence processing unit 48 and error diagnosing unit 49. Since the units denoted by the reference signs in the FIG. 12 has the same functions as that denoted by the reference signs in FIG. 1, here the description to those units will be omitted. Usually, the natural language query request input by a user may be a compound sentence that includes a plurality of combined sentences, for example, such compound sentence "Where is the Innovation Plaza? Which is the nearest bank to the Hailong Plaza?". A compound sentence may a compound that includes a parallel concept, for example, "Where is the Innovation Plaza and Hailong Plaza?".

Figure 9B:
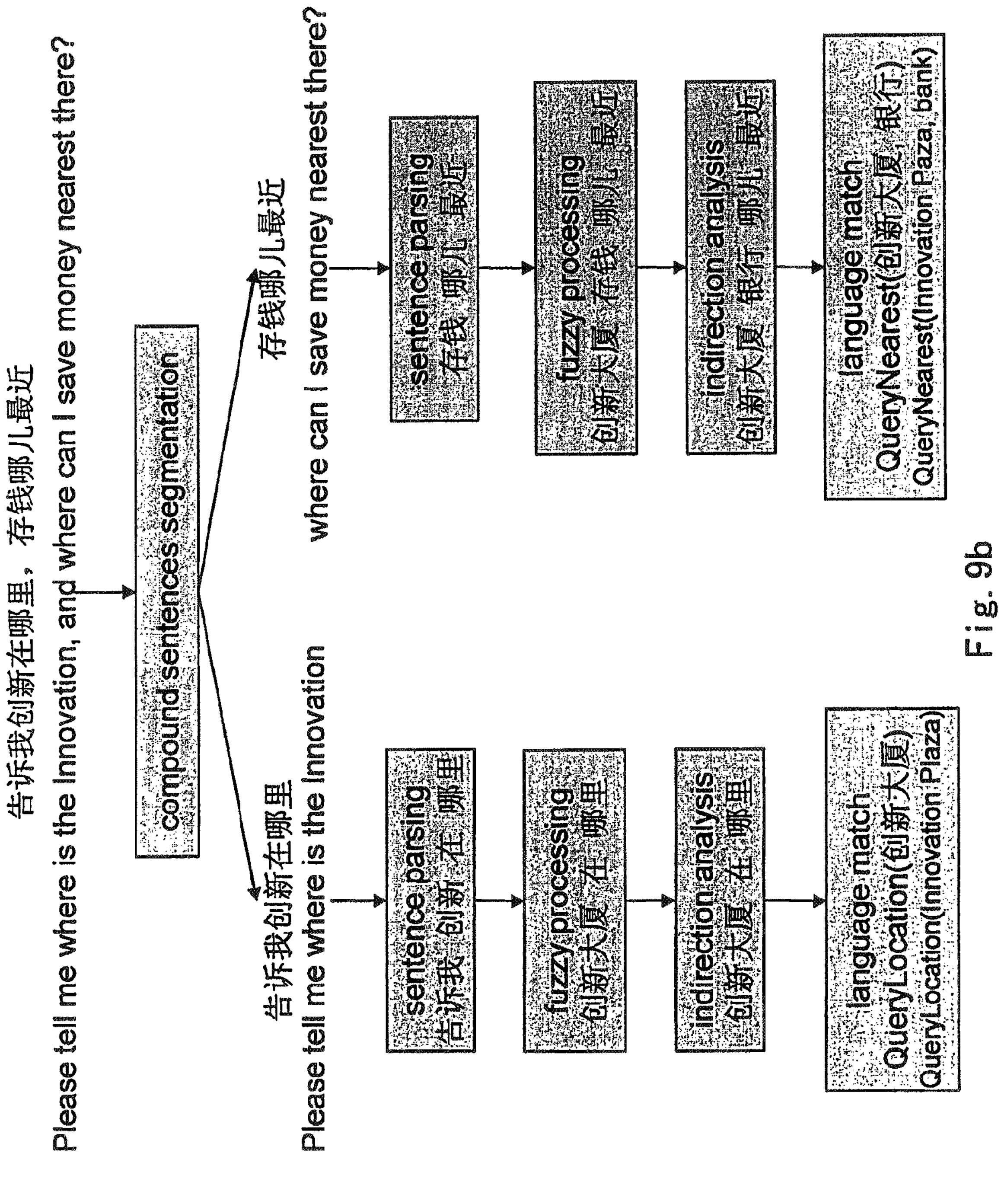
FIG. 9*b* shows an example illustrating the natural language query processing device processes a natural language query comprising compound sentences according to this invention.

The compound sentence processing unit 48 parses the natural language query request input by the user by means of the location query language base 22. The compound sentence processing unit 48 divides the compound sentence into a plurality of single sentences according to the punctuation and the location query language. The parsing unit 41, processing unit 42, indirection processing unit 43 and the language matching unit 44 will proceed to the next process. FIG. 9*b* shows an example illustrating the natural language query processing device processes a natural language query comprising compound sentences according to this invention.

The error diagnosing unit 49 identifies the semantic error and analyzes it by the access unit to access the location ontology base and the location query language base, on the basis of predetermined rules. Semantic errors include 1) classification errors and 2) incomplete errors.

The error diagnosing unit 49 checks if every variable in the user query can satisfy its constraint with respect to the classification errors. For a user query, the most similar syntax should be found first, and then the variables and constraints will be got by matching the query with the syntax. If a variable cannot satisfy its constraint, the error diagnosing unit 49 determines that the query request has a classification error. The location query system needs to provide error information and help information to interact with the user. If a user query request, for example, is "“银行在哪里 (Where is the bank)" and the most similar syntax is "{<?C(geo-entity)>}<! 位于动词> <! 拥有动词> ({<?C(geo-entity)>}<!verb expressing the location><! interrogative word expressing location>)", but "银行(bank)" is a category and cannot satisfy its constraint "geo-entity", so the query has a semantic error "bank is not a specific geographic entity".

For the second error, the error diagnosing unit 49 checks if the query request of the user is complete based on the location query language base. First, the most similar syntax will be found with respect to the query request. If the query request is a subset of the syntax, the query is not complete. If the lost information cannot be found in the context or the user's query history or other places, the query has an incomplete error. The location query system needs to provide error information and help information to interact with the user, for example, a user queries "怎么去创新大厦(How to get to the Innovation Plaza)", and the most similar syntax is "<?C1(geo-entity)> [<! 怎么疑问词>]<! 到达介词><?C2(geo-entity)> (<?C1(geo-entity)>[<!question word>]<!preposition expressing the arrival><?C2(geo-entity)>)", but "?C1" is lost. If the user's current location can not be obtained and the start point cannot be found in the context, the error diagnosing unit 49 determines that the query has a semantic error and the error is that the start point is lost. Then the error diagnosing unit 49 sends the information about diagnosed error to the answer fusing and generating unit 47. Then the answer fusing and generating unit 47 transmits the diagnosed error to the user terminal 5. Because the location query system can process the compound sentence query request, the answer fusing and generating unit 47 fuses the query results of all the query action with respect to the multiple query action corresponding to the compound sentence query request of the user after the search actions are fused for each of the query action. The example is a query request "创新大厦和海龙大厦? (which is the nearest restaurant to Innovation Plaza and Hailong Plaza)" containing two query action QueryNearest(海龙大厦, 饭[QueryNearest (Hailong Plaza, Restaurant)]" and "QueryNearest(创新, 饭)[QueryNearest(Innovation Plaza, Restaurant)]". The answer fusing and generating unit 47 needs to fuse the query result with respect to the two query actions.

Figure 13:
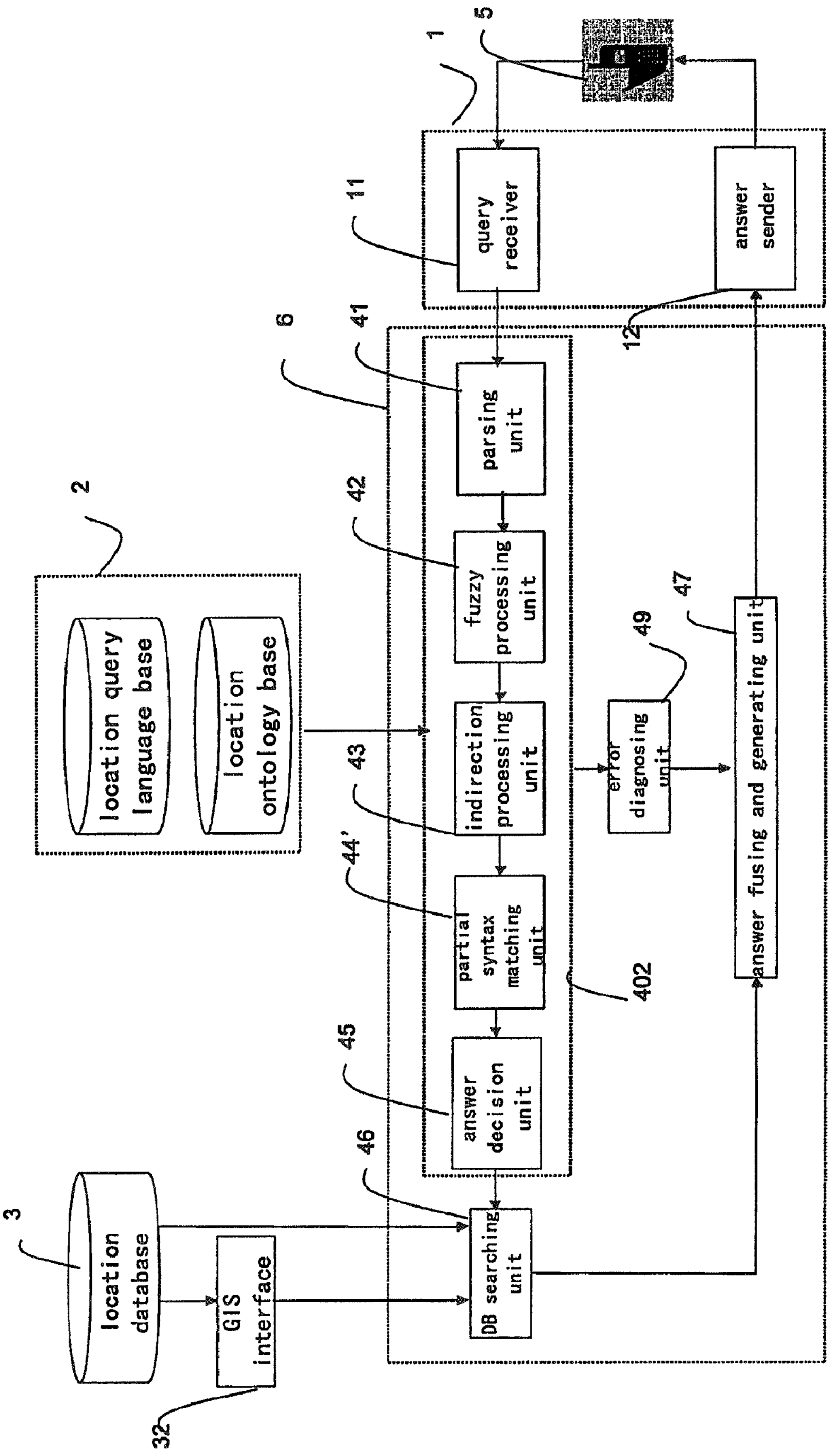
FIG. 13 is another embodiment of the keyword based location query system according to this invention.

FIG. 13 is another embodiment of the keyword based location query system according to this invention. The difference between FIG. 2 and FIG. 3 is that the location query system shown in FIG. 13 her comprises an error diagnosing unit 49, which is used to identify and analyze the semantic error of the keyword query of a user by the access unit to access the location ontology base and the location query language base, on the basis of a predetermined rule. The error diagnosing unit 49 sends the result of the diagnosed error to the 47. Then 47 transmits the result of the diagnosed error to the user terminal 5 so as to interact with the user.

Figure 14A:
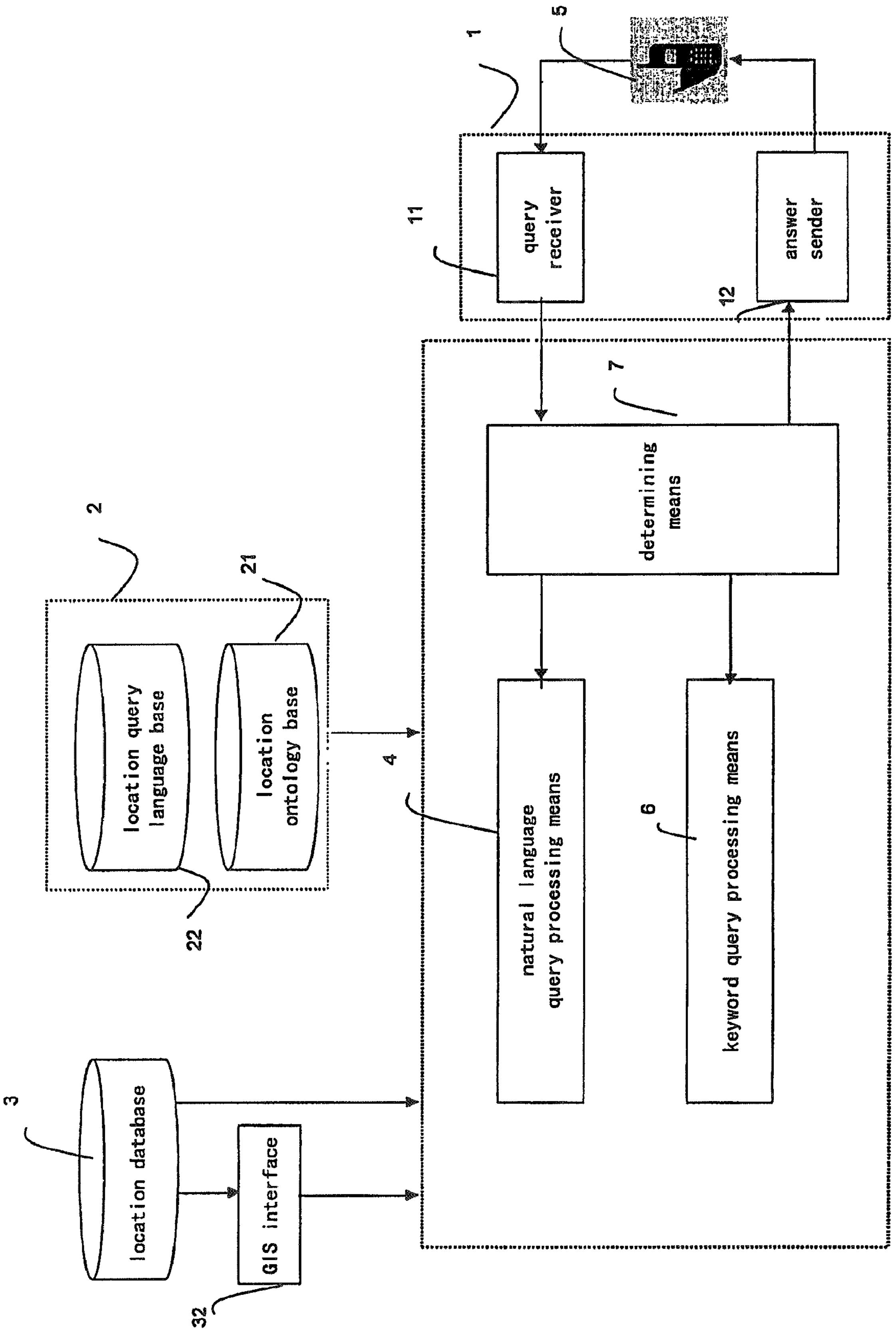
FIG. 14*a* is an embodiment of a natural language based and keyword based location query system according to this invention.
Figure 14B:
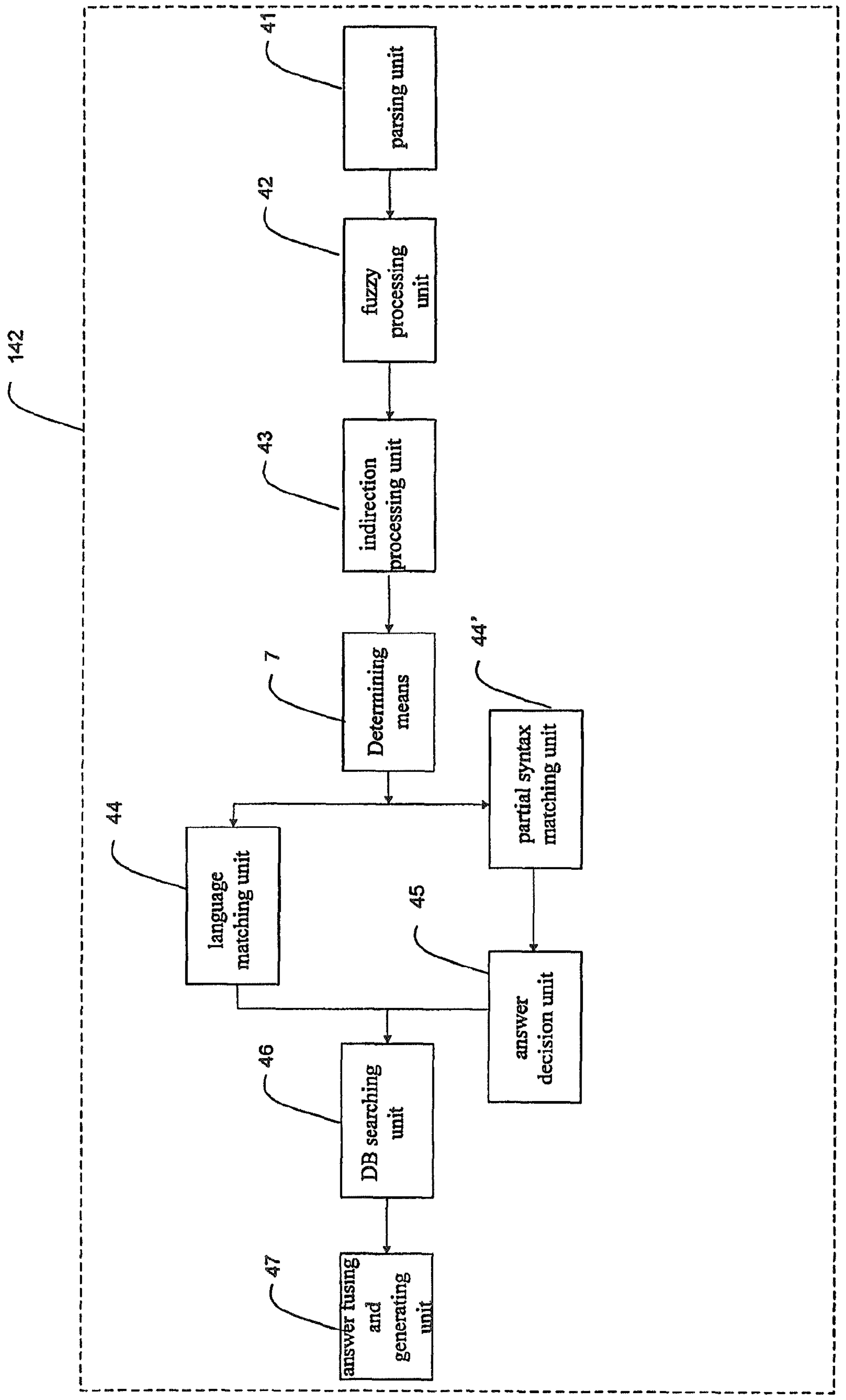
FIG. 14*b* shows another example of the processing device in the natural language based and keyword based location query system.

FIG. **14*a* and FIG. 14*b* are two embodiments of natural language based and keyword based location query system according to this invention. The system according to FIG. 14*a* comprises a user interface 1, a storing unit 2, a location database 3, a GIS interface 32, and a processing device comprising determining means 7, natural language query processing means 4 and keyword query processing means 6. The storing unit includes a location ontology base 21 and a location query language base 22. Moreover, since the natural language query processing means 4 and the keyword query processing means 6 have been described respectively by combining FIG. 1 and FIG. 12, FIG. 12 and FIG. 13, here will omit the description thereof. The determining means 7 determines if the query request received from the user terminal is a natural language query request or a keyword query request based on the features of the query request sentence. If the query request is a natural language query request, then the language query processing means 4 processes the query request and generates the answer corresponding to the location query. If the query request is a keyword query request, then the keyword query processing means 6 processes query request and searches the answer corresponding to the location query. Then the answer is sent to the user terminal 5 via the user interface 1**.

When the determining means 7 determines whether the query request is based on natural language or keyword, the query request of the user should be classified according to the feature of the query request sentence. Generally, the features of the natural language query and the keyword query are as the followings:

(1) A keyword query may have some logic operators, such as " " (space), "and", "or", "+", and ";" The query consists of several strings spaced by a several operators, and each string consists of one or more continuous words.

(2) A natural language query is a continuous string. It usually consists of several words, the middle of which may have logic operator, but the operator is meaningful, for example, the operators "and" may be used as a conjunction. In addition, a natural language query often contains an interrogative word (e.g. where, when, what).

The first determining method used by the determining means 7 is based on the logic operator, which includes 1) Check if there is any logic operator in the query. 2) If the words around an operator can constitute a complete word, delete the operator. 3) If there is no logic operator in the query, it determines that the user query is a natural language query; otherwise it's a keyword query request.

For example, a user queries "创新 大厦在哪里(Where is the Innovation Plaza)". Firstly, there is a space between "创新(Innovation)" and "大厦 (Plaza)", but they can constitute a complete word "创新大厦(Innovation Plaza)". Secondly, the query is an interrogative sentence. So the determining means 7 determines that the query is a natural language query.

The second method used by the determining means 7 is checking the completeness of the user query. A natural language query is usually an interrogative sentence that gives an explicit requirement, but a keyword query is usually not complete.

Another method adopted by the determining means 7 is selecting the optimum result after parallel analysis of natural language query and keyword query. Moreover, the determining means 7 can also use other known determination method to determine whether the query request received from the user terminal is a natural language query request or a keyword query request.

The method performed by the natural language based and keyword based location query system includes a determining step, a natural language based location query step as FIG. 2 shown and a keyword based location query step as FIG. 4 shown.

Although the location query system is illustrated by using the example of Chinese query, it is obviously that query in other languages can also used by the query system of the present invention, for example, English and Japanese query.

FIG. 14*b* shows another example of the processing device in the natural language based and keyword based location query system. Since the system has the same components comprising a user interface 1, a storing unit 2, a location database 3, a GIS interface 32, and an answer transmitter 12 as that of FIG. 14*a*, FIG. 14*b* only shows the processing device 142 in the natural language based and keyword based location query system. The processing device 142 comprises a parsing unit 41 which parses the request for the query by searching a category table, an entity table in the location ontology base and a constant table in the location query language base; a processing unit 42 which adds words to the description in the parsed request or deletes words from the fuzzy description by searching the location ontology base, the location query language base and a user query history, wherein the film description comprises at least one of a redundancy description and an incomplete description; an indirection processing unit 43 which converts indirect description in the query into the corresponding category name in the location ontology base by searching the category table in the location ontology base; determining means 7 for determining whether the query is a keyword query or a natural language query; a language matching unit 44 which matches the processed request with the location query language base when the request is a natural language query, and generates the query action corresponding to the query; a partial syntax matching unit 44' which partially matches the processed request with the location query language base when the request is a keyword query, and obtains a collection of the matched syntax; an answer deciding unit 45 which selects from the collection of the matched syntax the optimum matched syntax according to predetermined determination rules when the request is a keyword query, and generates a query action corresponding to the request; a database searching unit 46 which retrieves the corresponding query result from the location database according to the query action corresponding the query; and an answer fusing and generating unit 47 which fuses the query result to generate an answer, and sends the answer to the user terminal.

Although FIG. 14*b* shows the processing device 142 comprises fuzzy processing unit 42 and indirection processing unit 43, it may only comprise fuzzy processing unit 42 or indirection processing unit 43. Moreover, the processing device 142 may comprise the compound sentence processing unit 48 or the error diagnosing unit 49.

Figure 15:
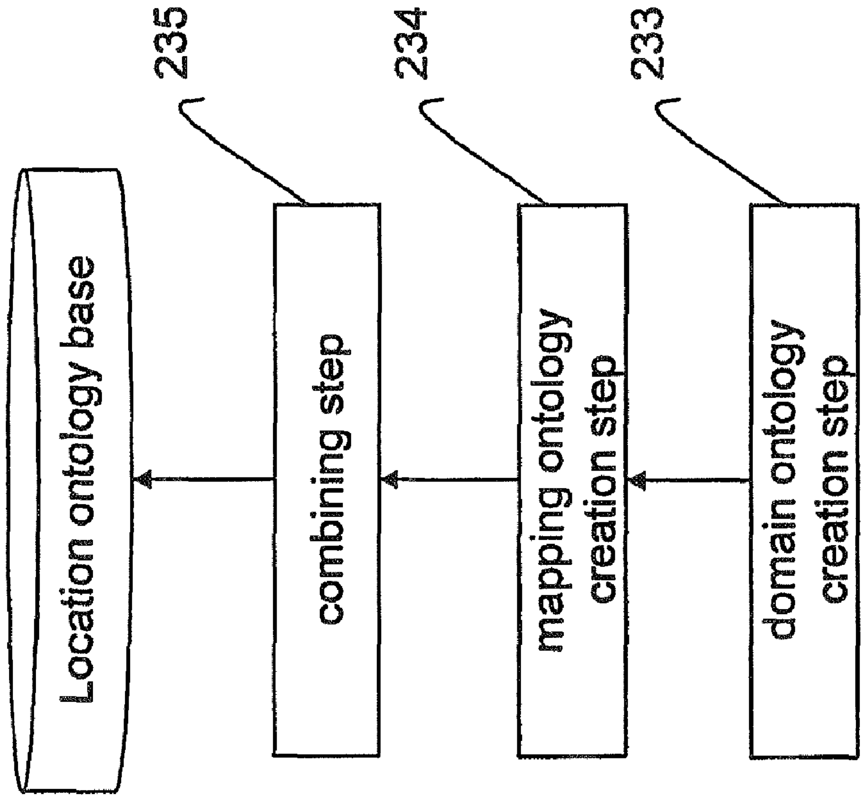
FIG. 15 shows a flow chart of a method for generating a location ontology base according to this invention.

FIG. 15 shows a flow chart of a method for generating location ontology base according to this invention. The method for generating location ontology base includes domain ontology creation step 233, mapping ontology creation step 234 and combing step 235.

Domain ontology creation step 233 is used to extract a domain ontology for each domain. It includes the steps of entity extraction, category extraction, attribute extraction and relation extraction.

Firstly, domain ontology creation step 233 extracts the entities from the information source of each domain. There are often different extraction methods for different domains. For example, when creating map ontology, the known GIS functions are used to extract all the names of the point of interests from the electronic map. Another example, when creating yellow page ontology, the known unrecognized word identification algorithm is used to extract, from the yellow page information of the WEB, the institution names and place names, etc. Then the entity table is generated.

Secondly, domain ontology creation step 233 extracts the categories. The known electronic map provides some coarse categories and the invention extends the categories on the basis thereof. First, basic categories are gathered from the electronic map directly. Second, extended categories are extracted from all entity names of the entity table by using the known statistic and clustering algorithm, according to the fact that extendable category is usually the high-frequent postfix of entity names. Third, chain stores are extracted from all entity names of the entity table by using the known statistic and clustering algorithm, according to the fact that chain store is usually the high-frequent prefix of entity names. Finally, synonymous words of each category are obtained according to above clustering result and a synonymous dictionary, and then the category table is generated.

Thirdly, domain ontology creation step 233 extracts the attributes. There are often different extraction methods for different domains. For example, when creating map ontology, the data fields of a map database are extracted (such as the longitude and the latitude). Another example, when creating yellow page ontology, all the possible attributes will be extracted from web pages by using the known information extracting algorithm. Then the type of each attribute is denoted manually.

Fourthly, domain ontology creation step 233 extracts the relations, which include the hierarchical relationship among categories, the hierarchical relationship between the entities and the categories and the spatial relationship between the entities. The hierarchical relationships among the categories are based on the known classifying standard of the point of interest and is modified and summarized manually. The hierarchical relationship between the entities and the categories is obtained on the basis of the result of the clustering of entities in the category extraction step. The spatial relationship among the entities is calculated by using the GIS function.

Finally, domain ontology creation step 233 combines the extracted entity table, category table, attributes, relations and the predetermined axiom so as to generate all domain ontologies.

Mapping ontology creation step 234 creates the mapping ontology according to various domain ontologies. It includes at least one of the steps of synonymy mapping relation extraction, language mapping relation extraction and geospatial mapping relation extraction.

Firstly, mapping ontology creation step 234 extracts synonymy mapping relations based on a synonymous dictionary and an abbreviation rule base. Synonymous dictionary comprises the synonymous mapping relation among concepts directly. Abbreviation rule base comprises the abbreviations of short phrases, and based on which, the synonymous mapping relation among concepts can be obtained. For example, the synonymous mapping relation between "北京大学附属小学" and "北大" (that mean High School Attached to Peking University) can be obtained, according to the abbreviation rule "abbreviate(北京大学, 北大) (Beijing University, Beida)" and "abbreviate(附属小学, 附小)".

Secondly, mapping ontology creation step 234 extracts language mapping relations based on a multi-lingual dictionary.

Finally, mapping ontology creation step 234 extracts geospatial mapping relations based on GIS functions.

Combing step 235 is used to combine the created domain ontologies and mapping ontology so as to generate the final location ontology base 21.

Figure 16:
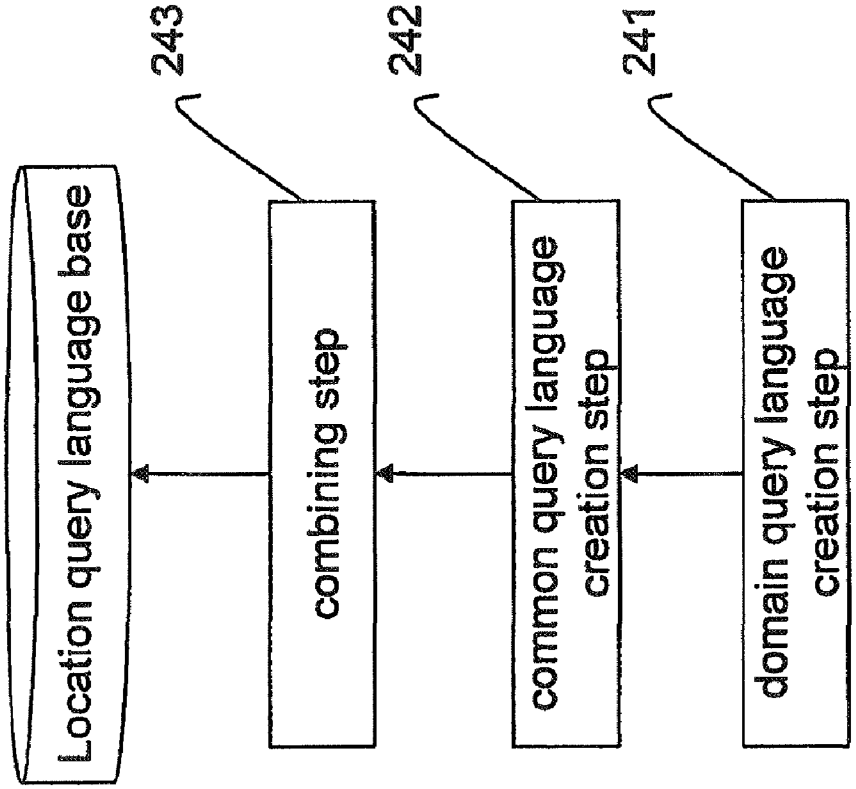
FIG. 16 shows a flow chart of a method for generating a location query language base according to this invention.

FIG. 16 shows a flow chart of a method for generating a location query language base according to this invention. The method for generating a location query language base includes domain query language creation step 241, common query language creation step 242 and combing step 243.

Domain query language creation step 241 is used to create a domain query language for each domain. It comprises the steps of question sentence collecting, corpus establishing, question sentence clustering and syntax extracting.

The question sentence collecting step is used to collect the set of real question sentences for each domain. The corpus establishing step is used to parse and label the question sentence (labeling comprises concept, noun, interrogative and verb, etc) using the known parsing algorithm, therefore, the question sentence corpus is generated. The question sentence clustering step is used to calculate the similarity among the question sentences and cluster the sentences according to the similarity.

The syntax extracting step summarizes the syntaxes according to the result of the clustering, and more specifically, it comprises the followings.

1) a syntax name is defined for each clustering classification.
2) Extract the query syntax according to the similarity of the question sentences of current clustering classification, by the following methods.

First, if there is a plurality of syntaxes, "|" is used to space them.

Second, a syntax can include one or more parts and each of the parts X is represented by <X>.

Third, a set of synonymous words are summarized to a constant and is represented by "<!constant name>". All the constants are stored in a constant table.

Fourth, a set of parallel concepts can be summarized to a variable and is represented by "<?variable name>". If the variable has constraint, it is represented by "<?variable name(constraints)>.

Fifth, if a certain part of the syntax is optional, the part is presented by adding "[ ]".

Sixth, if a certain part of the syntax is a set of parallel concepts, such part is represented by adding "{ }".

3) Action is defined with respect to each of the syntaxes. For example, "is Syntax(<LocationQuery>)→QueryLocation (?C)" describes that if the user query matches the syntax of "<LocationQuery>", the query action "QueryLocation (?C)" is generated.

Common query language creation step 242 calculates the similarity among the syntax of all domain query languages, and then extracts the common syntax to the common query language.

Combing step 243 is used to combine the created domain query languages and common query language so as to generate the final location query language base 22.

While specific embodiment and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A natural language based location query system comprising:

a receiving device which receives a request for natural language query for a location of an target entity having a specified geographical relationship to a known entity in the natural language query from a user terminal;

an access device which accesses a location ontology database and a location query language database using the known entity, wherein the location ontology database includes an index that geographically relates the target entity to the known entity, and the location query language database includes a syntax for a query to access a database having a location of the target entity, wherein the location query language database is generated by creation of domain query language and common query language, wherein the domain query language is created by collecting question sentences for each domain, extracting syntax and a constant table from the question sentences, and combining the extracted syntax and a query action corresponding to the syntax, and the common query language is created by calculating a similarity among all domain query languages, and extracting a common query language;

a natural language query processing device including at least one of a fuzzy processing unit and an indirection processing unit which parses the natural language query to determine the known entity of the natural language query and performs at least one of a fuzzy processing and an indirection processing on the received request for natural language query by searching the location ontology database and the location query language database for the known entity with the access device, and retrieves location information corresponding to the known entity from a location database, wherein the fuzzy processing unit processes a fuzzy description in the parsed request by searching the location ontology database, the location query language database and a user query history, and the fuzzy processing unit comprises at least one of a unit that deletes redundant words based on a grammar feature, a unit that detects and completes incomplete words based on the location ontology, and a unit that finds words omitted by the user by using context-aware technology based on the user's query history, and the indirection processing unit converts an indirect description in the query into a corresponding category name in the location ontology database by searching the category table in the location ontology database; and a sending device which sends the location information of the known entity to the user terminal.

2. The system of claim 1, wherein the natural language query processing device comprises:

a parsing unit which parses the request for natural language query by searching a category table, an entity table in the location ontology database and a constant table in the location query language database, wherein the parsed request for natural language query is processed by at least one of the fuzzy processing unit and the indirection processing unit;

a fuzzy processing unit which adds words to the fuzzy description in the parsed request or deletes words from the fuzzy description by searching the location ontology database, the location query language database and a user query history, wherein the fuzzy description comprises at least one of a redundancy description and an incomplete description;

an indirection processing unit which converts the indirect description in the query into the corresponding category name in the location ontology database by searching the category table in the location ontology database;

a query language matching unit which matches the processed request with the location query language database, and generates the query action corresponding to the query;

a database searching unit which retrieves the corresponding query result from the location database according to the query action; and an answer fusing and generating unit which fuses the query result to generate an answer, and sends the answer to the user terminal.

3. The system of one of claim 2, wherein the natural language query processing device further comprises:

a compound sentence processing unit which divides the request for natural language query which comprises a compound sentence into a plurality of separate request for natural language query and provides the divided request to the parsing unit.

4. The system of one of claim 2, wherein said query language matching unit transforms the description that doesn't satisfy the concept constraint of the matched syntax by searching the mapping ontology of location ontology database.

5. The system of one of claims 2 or 3, wherein the natural language query processing device further comprises:

an error diagnosing unit which identifies and analyzes the semantic error in the request for the natural language query according to predetermined rules after the matching by the query language matching unit is failed, and sends the information about the identified error to the user terminal through the answer fusing and generating unit.

6. A natural language based location query method, the method comprising:

a receiving step of receiving a request for natural language query for a location of an target entity having a specified geographical relationship to a known entity in the natural language query sent from a user terminal by a user;

a natural language query processing step of parsing the natural language query to determine the known entity of the natural language query and performing at least one of a fuzzy processing and an indirection processing on the received request for natural language query by searching a location ontology database and a location query language database for the known entity, and retrieving location information corresponding to the known entity from a location database, wherein the location query language database is generated by creation of a domain query language and a common query language, wherein the domain query language is created by collecting question sentences for each domain, extracting syntax and a constant table from the question sentences, and combing the extracted syntax and a query action corresponding to the syntax, and the common query language is created by calculating a similarity among all domain query languages, and extracting a common query language, wherein the fuzzy processing step comprises at least one step of deleting redundant words based on a grammar feature, detecting and completing incomplete words based on the location ontology, and finding words omitted by the user by using context-aware technology based on the user's query history, and the indirection processing step comprises converting an indirect description in the query into a corresponding category name in the location ontology database by searching the category table in the location ontology base; and a transmitting step of transmitting the location information of the known entity to the user terminal, wherein the location ontology database includes an index that geographically relates the target entity to the known entity and the location query language database includes a syntax for a query to access a database having a location of the target entity.

7. The method of claim 6, wherein the natural language query processing step comprises:

a parsing step of parsing the request for natural language query by searching a category table, an entity table in the location ontology database and a constant table in the location query language database;

a fuzzy processing step of performing, to the fuzzy description in the parsed request, at least one step of deleting redundant words based on a grammar feature, detecting and completing incomplete words based on the location ontology, and finding words omitted by the user by using context-aware technology based on the user's query history;

an indirection processing step of converting indirect description in the query into the corresponding category name in the location ontology database by searching the category table in the location ontology database;

a query language matching step of matching the processed request with the location query language database, and generating the query action corresponding to the query;

a database searching step of retrieving the corresponding query result from the location database according to the query action; and an answer fusing and generating step of fusing the query result to generate an answer, and sends the answer to the user terminal.

8. The method of claim 7, wherein the natural language query processing step further comprises:

a compound sentence processing step of dividing the request for natural language query which comprises a compound sentence into a plurality of separate request for natural language query and provides the divided request to the parsing unit.

9. The method of one claim 7, wherein said query language matching step further comprises transforming the description that don't satisfy the concept constraint of the matched syntax by searching the mapping ontology of location ontology database.

10. The method of claim 8, wherein the natural language query processing step further comprises:

an error diagnosing step of identifying and analyzing the semantic error in the request for the natural language query according to predetermined rules after the query language matching is failed, and sending the information about the identified error to the user terminal.

11. The method of claim 6, wherein the method further comprises a location ontology database generating step, comprising:

a domain ontology creation step of extracting an entity table and a category table, attributes and relations from an electronic map and Web pages, and combining them with predetermined axiom part so as to generate a domain ontology for each domain;

a mapping ontology creation step of extracting at least one of synonymy mapping relations, language mapping relations and geospatial mapping relations based on a synonymous dictionary, an abbreviation rule base, a multi-lingual dictionary and an electronic map, and combining them so as to generate a mapping ontology.

12. A keyword based location query system comprising:

a receiving device which receives a request for keyword query for a location of an target entity having a specified geographical relationship to a known entity in the keyword query from a user terminal;

an access device which accesses a location ontology database and a location query language database, wherein the location ontology database includes an index that geographically relates the target entity to the known entity, and the location query language database includes a syntax for a query to access a database having a location of the target entity, wherein the location query language database is generated by creation of domain query language and common query language, wherein the domain query language is created by collecting question sentences for each domain, extracting syntax and a constant table from the question sentences, and combining the extracted syntax and a query action corresponding to the syntax, and the common query language is created by calculating a similarity among all domain query languages, and extracting a common query language;

a keyword query processing device including at least one of a fuzzy processing unit and an indirection processing unit which parses the keyword query to determine the known entity of the keyword query and performs at least one of a fuzzy processing and an indirection processing on the received request for keyword query by searching the location ontology database and the location query language database for the known entity with the access device, and retrieves location information corresponding to the known entity from a location database, wherein the fuzzy processing unit processes a fuzzy description in the parsed request by searching the location ontology database, the location query language database and a user query history, and the fuzzy processing unit comprises at least one of a unit that deletes redundant words based on a grammar feature, a unit that detects and completes incomplete words based on the location ontology, and a unit that finds words omitted by the user by using context-aware technology based on the user's query history, and the indirection processing unit converts an indirect description in the query into a corresponding category name in the location ontology database by searching the category table in the location ontology database; and a sending device which sends the location information of the known entity to the user terminal.

13. The system of claim 12, wherein the keyword query processing device comprises:

a parsing unit which parses the request for keyword query by searching a category table, an entity table in the location ontology database and a constant table in the location query language database, wherein the parsed request for keyword query is processed by at least one of the fuzzy processing unit and the indirection processing unit;

a fuzzy processing unit which adds words to the fuzzy description in the parsed request or deletes words from the fuzzy description by searching the location ontology database, the location query language database and a user query history, wherein the fuzzy description comprises at least one of a redundancy description and an incomplete description;

an indirection processing unit which converts indirect description in the query into the corresponding category name in the location ontology database by searching the category table in the location ontology database;

a partial syntax matching unit which partially matches the processed request with the location query language database, and obtains a collection of the matched syntax;

an answer deciding unit which selecting from the collection of the matched syntax the optimum matched syntax according to predetermined determination rules, and generating a query action corresponding to the request;

a database searching unit which retrieves the corresponding query result from the location database based on the query action; and an answer fusing and generating unit which fuses the query result to generate an answer, and sends the answer to the user terminal.

14. The system of claim 13, wherein the keyword query processing device further comprises:

an error diagnosing unit which identifies and analyzes the semantic error in the request of the keyword query according to predetermined rules after the partial syntax matching is failed, and sends the information about the identified error to the user terminal.

15. The system of claim 13, wherein said answer deciding unit transforms the description that doesn't satisfy the concept constraint of the matched syntax by searching the mapping ontology of location ontology database.

16. A natural language based and keyword based location query system comprising:

a receiving device which receives a request for a query for a location of an target entity having a specified geographical relationship to a known entity in the query from a user terminal, the query being one of a natural language query and a keyword query;

an access device which accesses a location ontology database and a location query language database using the known entity, wherein the location ontology database includes an index that geographically relates the target entity to the known entity, and the location query language database includes a syntax for a query to access a database having a location of the target entity, wherein the location query language database is generated by creation of domain query language and common query language, wherein the domain query language is created by collecting question sentences for each domain, extracting syntax and a constant table from the question sentences, and combining the extracted syntax and a query action corresponding to the syntax, and the common query language is created by calculating a similarity among all domain query languages, and extracting a common query language;

a natural language query and keyword query processing device including at least one of a fuzzy processing unit and an indirection processing unit which parses the query to determine the known entity of the query and performs at least one of a fuzzy processing and an indirection processing on the natural language and/or keyword query request sent from a user terminal by searching the location ontology database and the location query language database for the known entity with the access device, and retrieves location information corresponding to the known entity from a location database, wherein the fuzzy processing unit processes a fuzzy description in the parsed request by searching the location ontology database, the location query language database and a user query history, and the fuzzy processing unit comprises at least one of a unit that deletes redundant words based on a grammar feature, a unit that detects and completes incomplete words based on the location ontology, and a unit that finds words omitted by the user by using context-aware technology based on the user's query history, and the indirection processing unit converts an indirect description in the query into a corresponding category name in the location ontology database by searching the category table in the location ontology database; and a sending device which sends the location information of the known entity to the user terminal.

17. The system of claim 16, wherein the natural language query and keyword query processing device comprises:

a parsing unit which parses the request for the query by searching a category table, an entity table in the location database base and a constant table in the location query language database, wherein the parsed request for natural language query is processed by at least one of the fuzzy processing unit and the indirection processing unit;

a fuzzy processing unit which adds words to the fuzzy description in the parsed request or deletes words from the fuzzy description by searching the location ontology database, the location query language database and a user query history, wherein the fuzzy description comprises at least one of a redundancy description and an incomplete description;

an indirection processing unit which converts indirect description in the query into the corresponding category name in the location ontology database by searching the category table in the location ontology database;

a determining unit which determines whether the request received from a user terminal is a request for natural language query or a request for keyword query;

a query language matching unit which matches the processed request with the location query language database when the request is a natural language query, and generates the query action corresponding to the query;

a partial syntax matching unit which partially matches the processed request with the location query language database when the request is a keyword query, and obtains a collection of the matched syntax;

an answer deciding unit which selects from the collection of the matched syntax the optimum matched syntax according to predetermined determination rules when the request is a keyword query, and generates a query action corresponding to the request;

a database searching unit which retrieves the corresponding query result from the location database according to the query action corresponding the query; and an answer fusing and generating unit which fuses the query result to generate an answer, and sends the answer to the user terminal.

18. The system claim 17, wherein said query language matching unit transforms the description that doesn't satisfy the concept constraint of the matched syntax by searching the mapping ontology of location ontology base, and said answer deciding unit transforms the description that doesn't satisfy the concept constraint of the matched syntax by searching the mapping ontology of location ontology database.

19. A natural language based and keyword based location query method, the method comprising:

receiving a request for a query for a location of an target entity having a specified geographical relationship to a known entity in the keyword query from a user terminal;

a determining step of determining whether the received request is one of a request for a natural language query or a request for a keyword query;

when the request is a request for the natural language query, a natural language query processing step of parsing the natural language query to determine the known entity of the natural language query and performing at least one of a fuzzy processing and an indirection processing on the request for natural language query sent from the user terminal by searching a location ontology database and a location query language database for the known entity, and retrieving location information corresponding to the known entity from a location database, wherein the location query language database is generated by creation of a domain query language and a common query language, wherein the domain query language is created by collecting question sentences for each domain, extracting syntax and a constant table from the question sentences, and combing the extracted syntax and a query action corresponding to the syntax, and the common query language is created by calculating a similarity among all domain query languages, and extracting a common query language, wherein the fuzzy processing step comprises at least one step of deleting redundant words based on a grammar feature, detecting and completing incomplete words based on the location ontology, and finding words omitted by the user by using context-aware technology based on the user's query history, and the indirection processing step comprises converting an indirect description in the query corresponding category name in the location ontology database by searching the category table in the location ontology base; and a first transmitting step of sending the location information of the known entity to the user terminal;

when the request is a request for keyword query, a keyword query processing step of parsing the keyword query to determine the known entity of the keyword query and performing at least one of a fuzzy processing and an indirection processing on a request for keyword query sent from a user terminal by searching the location ontology database and the location query language database for the known entity, retrieving location information corresponding to the known entity form a location database; and a second transmitting step of sending the location information of the known entity to the user terminal, wherein the location ontology database includes an index that geographically relates the target entity to the known entity and the location query language database includes a syntax for a query to access a database having a location of the target entity.

20. The method of claim 19, wherein the natural language query processing step comprises:

a parsing step of parsing the request for natural language query by searching a category table, an entity table in the location ontology database and the constant table of the syntax part in the location query language database;

a fuzzy processing step of performing, to the fuzzy description in the parsed request, at least one step of deleting redundant words based on a grammar feature, detecting and completing incomplete words based on the location ontology, and finding words omitted by the user by using context-aware technology based on the user's query history;

an indirection processing step of converting indirect description in the query into the corresponding category name in the location ontology database by searching the category table in the location ontology database;

a query language matching step of matching the processed request with the location query language database, and generating the query action corresponding to the query;

a database searching step of retrieving the query result from a location database according to the query action corresponding the query; and an answer fusing and generating step of fusing the query result to generate an answer, and sending the answer to the user terminal.

21. The method of claim 19, wherein the keyword query processing step comprises:

a parsing step of parses the request for keyword query by searching a category table, an entity table in the location ontology database and a constant table in a syntax part of the location query language database;

a fuzzy processing step of performing, to the fuzzy description in the parsed request, at least one step of deleting redundant words based on a grammar feature, detecting and completing incomplete words based on the location ontology, and finding words omitted by the user by using context-aware technology based on the user's query history;

an indirection processing step of converts indirect description in the query into the corresponding category name in the location ontology base by searching the category table in the location ontology database;

a partial syntax matching step of partially matches the processed request with the location query language database, and obtains a collection of the syntax matching;

an answer deciding step of selecting form the collection of the syntax matching the optimum matched syntax according to predetermined determination rules, and generating a query action corresponding to the request;

a database searching step of retrieves the corresponding query result from the location database based on the query action; and an answer fusing and generating step of fusing the query result to generate an answer, and sending the answer to the user terminal.

22. The method of claim 20, wherein said query language matching step further comprises transforming the description that don't satisfy the concept constraint of the matched syntax by searching the mapping ontology of location ontology database.

23. The method of claim 21, wherein said answer deciding step further comprises transforming the description that doesn't satisfy the concept constraint of the matched syntax by searching the mapping ontology of location ontology database.

* * * * *